US012576648B2

(12) United States Patent
Maruyama

(10) Patent No.: US 12,576,648 B2
(45) Date of Patent: Mar. 17, 2026

(54) INK JET RECORDING DEVICE

(71) Applicant: SEIKO EPSON CORPORATION, Tokyo (JP)

(72) Inventor: Tomoki Maruyama, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 275 days.

(21) Appl. No.: 18/332,170

(22) Filed: Jun. 9, 2023

(65) Prior Publication Data

US 2023/0398785 A1 Dec. 14, 2023

(51) Int. Cl.

| | |
|---|---|
| ***B41J 2/175*** | (2006.01) |
| ***C09D 11/03*** | (2014.01) |
| ***C09D 11/328*** | (2014.01) |
| ***C09D 11/38*** | (2014.01) |

(52) U.S. Cl.

CPC ........... *B41J 2/17566* (2013.01); *C09D 11/03* (2013.01); *C09D 11/328* (2013.01); *C09D 11/38* (2013.01); *B41J 2002/17579* (2013.01)

(58) Field of Classification Search

CPC ......................... B41J 2/17503; B41J 2/17506; B41J 2/17509; B41J 2/17513; B41J 2/1752; B41J 2/1753; B41J 2/17553; B41J 2/17566; B41J 2002/17579; C09D 11/03; C09D 11/328; C09D 11/38; G01F 23/263; G01F 23/265; G01F 23/266; G01F 25/0084; G01F 25/20

See application file for complete search history.

(56) References Cited

U.S. PATENT DOCUMENTS

| | | | | | |
|---|---|---|---|---|---|
| 4,099,167 | A * | 7/1978 | Pomerantz | G01F 23/265 | 73/304 C |
| 4,676,101 | A * | 6/1987 | Baughman | G01F 23/266 | 73/304 C |
| 5,142,909 | A * | 9/1992 | Baughman | G01F 23/266 | 73/304 C |
| 7,029,082 | B2 * | 4/2006 | Farr | B41J 2/17566 | 347/92 |
| 2006/0196390 | A1 * | 9/2006 | Rehman | C09D 11/38 | 106/31.86 |
| 2020/0238716 | A1 * | 7/2020 | Okada | B41J 2/19 | |
| 2021/0094308 | A1 * | 4/2021 | Yonemura | G01F 23/268 | |

FOREIGN PATENT DOCUMENTS

JP 2021-056080 A 4/2021

* cited by examiner

*Primary Examiner* — Anh T Vo

(74) *Attorney, Agent, or Firm* — Harness, Dickey & Pierce, P.L.C.

(57) ABSTRACT

An ink jet recording device of the present disclosure is an ink jet recording device including an ink amount detection device that includes a container internally having an accommodation space that accommodates an ink jet ink composition, a first electrode and at least one second electrode disposed to face each other via the accommodation space, and a capacitance detection unit detecting a capacitance between the first electrode and the second electrode using a mutual capacity method, in which the ink jet ink composition has an electrical conductivity of 10.0 mS/cm or less.

7 Claims, 12 Drawing Sheets

INK JET RECORDING DEVICE

The present application is based on, and claims priority from JP Application Serial Number 2022-094196, filed Jun. 10, 2022, the disclosure of which is hereby incorporated by reference herein in its entirety.

BACKGROUND

1. Technical Field

The present disclosure relates to an ink jet recording device.

2. Related Art

In the related art, an ink jet recording device that records an image and the like on a recording medium using minute ink droplets jetted from nozzles of a recording head for ink jet recording is known. Since such an ink jet recording device supplies an ink composition to the recording head, the ink jet recording device includes an ink container such as an ink cartridge.

JP-A-2021-56080 discloses a detection device including an ink container that internally has an accommodation space accommodating an ink composition, a first electrode and at least one second electrode that are disposed to face each other via the accommodation space, and a capacitance detection unit that detects the capacitance between the first electrode and the second electrode using a mutual capacity method to detect the amount of an ink remaining in the container, and an ink jet recording device including the detection device.

However, since the detection device described in JP-A-2021-56080 includes the electrodes on a wall surface, when the wall surface at a position higher than the height of the liquid face is wet with the ink, the capacitance is detected at a height at which the wall surface is wet. Therefore, the height of the ink liquid face is difficult to detect correctly.

SUMMARY

According to an aspect of the present disclosure, there is provided an ink jet recording device including an ink amount detection device that includes a container internally having an accommodation space that accommodates an ink jet ink composition, a first electrode and at least one second electrode disposed to face each other via the accommodation space, and a capacitance detection unit detecting a capacitance between the first electrode and the second electrode using a mutual capacity method, in which the ink jet ink composition has an electrical conductivity of 10.0 mS/cm or less.

DESCRIPTION OF EXEMPLARY EMBODIMENTS

Figure 1:
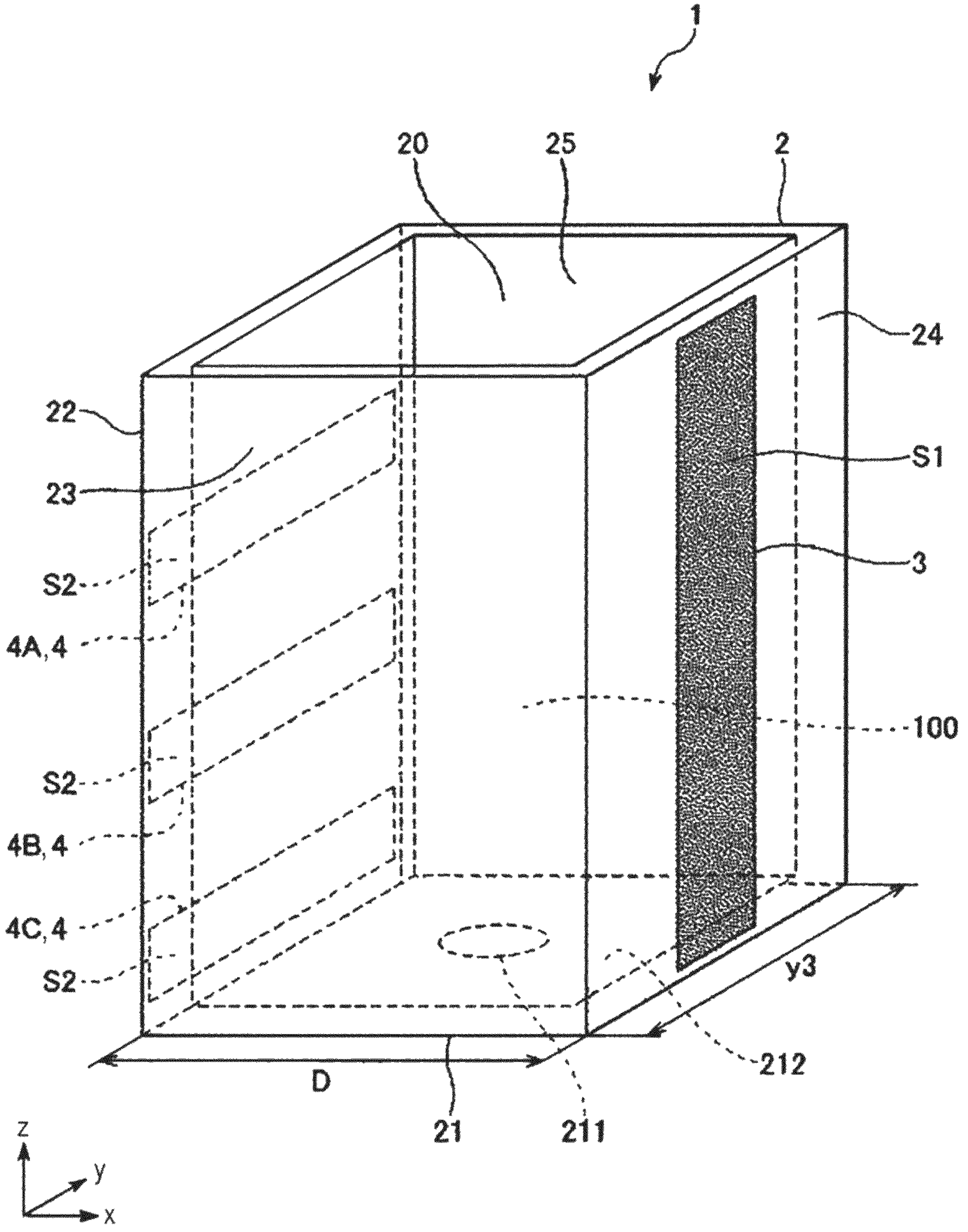
FIG. 1 is a perspective view showing a container of an ink amount detection device.

Hereinafter, the present disclosure will be described in detail using an ink jet recording device equipped with an ink container (hereinafter, also referred to as "container") according to an embodiment of the present disclosure (hereinafter, also referred to as "present embodiment") as an example with reference to the accompanying drawings. Further, scales may be changed as appropriate in order to facilitate understanding the structure of the ink jet recording device according to the present embodiment.

Further, in FIGS. 1, 5, 6, and 13, an x-axis, a y-axis, and a z-axis are set as three axes orthogonal to each other for convenience of description, and the description will be made based on the three axes in the present specification. Further, in the present specification, a direction parallel to the x-axis will be referred to as "x-axis direction", a direction parallel to the y-axis will be referred to as "y-axis direction", and a direction parallel to the z-axis will be referred to as "z-axis direction".

In the present specification, in FIGS. 1, 5, 6, and 13, the z-axis direction, that is, the longitudinal direction will be referred to as "vertical direction", the x-axis direction and the y-axis direction, that is, the lateral direction will be referred to as "horizontal direction", and an x-y plane will be referred to as "horizontal plane".

In the present specification, the tip side of each arrow shown in the figures will be referred to as "+(plus)" or "positive", and the base end side thereof will be referred to as "– (minus)" or "negative"). Further, for convenience of description, in FIGS. 1, 4, 5, and 11, a +z-axis direction, that is, an upper side will be referred to as "up" or "upward", and a –z-axis direction, that is, a lower side will be referred to as "down" or "downward".

In the present specification, a dielectric denotes a substance having insulating properties. In addition, the dielectric denotes a substance with a relative dielectric constant of greater than that of air, that is, a substance with a relative dielectric constant of greater than 1.

1. Ink Jet Recording Device

An ink jet recording device of the present embodiment (hereinafter, also referred to as "recording device") is a recording device including an ink amount detection device that includes a container internally having an accommodation space that accommodates an ink jet ink composition (hereinafter, also referred to as "ink composition" or "ink"), a first electrode and at least one second electrode disposed to face each other via the accommodation space, and a capacitance detection unit detecting a capacitance between the first electrode and the second electrode using a mutual capacity method, in which the ink jet ink composition has an electrical conductivity of 10.0 mS/cm or less.

Erroneous detection in the capacitance type detection can be suppressed by using such an ink jet recording device and particularly using an ink composition with an electrical conductivity of 10.0 mS/cm or less. Therefore, the ink liquid face height can be detected more accurately and the remaining amount of the ink can be detected with higher precision.

1.1. Ink Jet Ink Composition

A container 2 according to the present embodiment is capable of accommodating an ink 100. The ink 100 may be designed to satisfy the required characteristics based on the structures and the properties of a recording device 10 and the container 2.

It is preferable that the ink 100 be an aqueous ink. Since the aqueous ink has a high capacitance, there is a tendency that the height of the ink liquid face can be detected more accurately and the remaining amount of the ink can be detected with higher precision in the capacitance type detection of the ink amount. Further, when the aqueous ink is used, the environmental load can be reduced, and for example, recording can be performed with less odor. In the present specification, the term "aqueous" denotes a composition containing water as one of the main solvent components.

Next, the physical properties of the ink 100 will be described. The composition of the ink 100, the method of producing the ink 100, the ink jet recording device 10, the ink amount detection device 1, and the like will be described below in detail.

1.1.1. Physical Properties of Ink 100

1.1.1.1. Electrical Conductivity of Ink 100

The electrical conductivity of the ink according to the present embodiment is 10.0 mS/cm or less. Excellent effects are obtained by using such an ink 100. The reason for this will be described with reference to the perspective view of FIG. 1 showing the container 2 of the ink amount detection device 1, the schematic view of FIG. 2 showing a part of the internal structure of the container 2, and the schematic view of FIG. 3 showing the transition of the liquid face of the ink 100 in the accommodation space 20 of the container 2.

Figure 2:
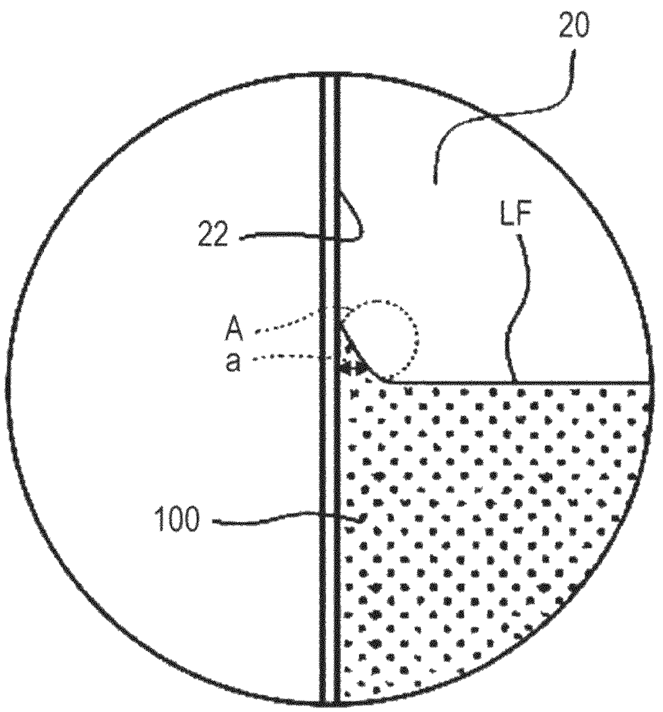
FIG. 2 is a schematic view showing a part of the internal structure of the container.

In the container 2 as shown in FIGS. 1 and 2, a boundary portion A where a portion that can come into contact with the ink 100 inside side walls 22 to 25 (hereinafter, also collectively referred to as "inner wall surface") partitioning the accommodation space 20, that is, inside the accommodation space 20 and a gas-liquid interface on a liquid face LF of the ink 100 are in contact with each other, a thin film of the ink 100 is likely to be formed. Here, the ink 100 is required to have a certain degree of wettability to form an image with a satisfactory image quality using the ink 100, but a thin film is likely to be formed when the inner wall surface is wet with the ink 100. Particularly when the wettability between the member constituting the inner wall surface and the ink 100 is high, the inner wall surface is more likely to be wet with the ink 100, and thus a concave meniscus is formed.

A specific example of the concave meniscus will be described with reference to the schematic view of FIG. 2 showing a part of the internal structure of the container 2. As shown in the schematic view of FIG. 2, a concave meniscus is formed at the boundary portion A where the inside of the side wall 22 that is one of the inner wall surfaces and the liquid face LF of the ink 100 are in contact with each other. As indicated by both arrows in FIG. 2, since a distance a from the gas-liquid interface of the ink 100 to the inside of the side wall 22 is short in the concave meniscus portion, a thin film is likely to be formed due to consumption or drying of the ink 100. In the present embodiment, the remaining amount of the ink 100 in the container 2 is detected by detecting the capacitance between a first electrode 3 and a second electrode 4 using a mutual capacity method. Therefore, when a thin film is formed, the height of the liquid face of the ink 100 cannot be accurately detected.

Figure 3:
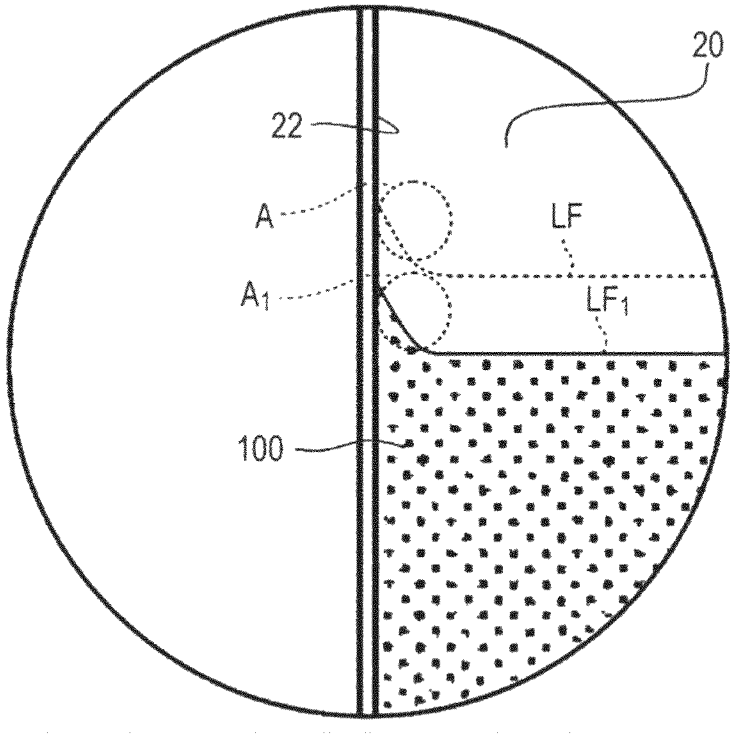
FIG. 3 is a schematic view showing transition of a liquid face of an ink in an accommodation space of the container.

Further, when the liquid face of the ink 100 is dropped from LF to $LF_1$ as the ink 100 is consumed as shown in FIG. 3, the concave meniscus formed at the boundary portion A is dropped to a boundary portion $A_1$. In this case, the ink 100 may remain on the wall surface present between the boundary portion A and the boundary portion $A_1$. Since the remaining amount of the ink 100 is detected by detecting the capacitance between the first electrode 3 and the second electrode 4 using a mutual capacity method, the height of the liquid face of the ink 100 cannot be accurately detected when the ink 100 remains thereon.

The present inventors found that a thin film of the ink 100 formed at the boundary portion A is difficult to energize and the ink 100 remaining on the wall surface present between the boundary portion A and the boundary portion A1 is also difficult to energize when the ink 100 having an electrical conductivity of 10.0 mS/cm or less is used as the ink that also fills the container 2. In this manner, erroneous detection in the capacitance type detection caused by the formation of a thin film of the ink 100 or the remaining of the ink 100 on the wall surface can be suppressed. Therefore, the height of the liquid face of the ink 100 can be detected more accurately, and the remaining amount of the ink 100 can be detected with higher precision.

In the present specification, the electrical conductivity of the ink 100 can be measured by a known electrical conductivity meter. Examples may be referred to for the specific measuring method thereof.

In the present embodiment, a desired electrical conductivity of the ink 100 can be obtained by appropriately controlling components blended into the ink 100 and preferably the blending ratio of the components.

The electrical conductivity of the ink 100 is preferably 8.0 mS/cm or less. When an ink composition having the electrical conductivity in the above-described range is used, since a thin film of the ink 100 formed at the boundary portion A is difficult to energize and the ink 100 remaining on the wall surface present between the boundary portion A and the boundary portion A1 is more difficult to energize, erroneous detection in the capacitance type detection is more likely to be suppressed. The lower limit of the electrical conductivity of the ink 100 is not particularly limited, but is preferably 0.5 mS/cm or greater and more preferably 1.0 mS/cm or greater from the viewpoint that the ink 100 is required to be energized in consideration of the ink remaining amount to be detected by the mutual capacity method.

1.1.1.2. Surface Tension of Ink 100

The surface tension of the ink 100 at 25° C. is preferably 25 mN/m or greater and more preferably 27 mN/m or greater and 40 mN/m or less. When an ink composition having the surface tension in the above-described range is used, since the wall surface is less likely to be wet with the ink 100 and the formation of a thin film derived from the ink 100 and the remaining of the ink 100 can be more suitably suppressed, erroneous detection in the capacitance type detection is more likely to be suppressed. Further, when the surface tension of the ink 100 is in the above-described ranges, the wet spreadability on a recording medium is likely to be appropriate, and the jetting stability and the initial filling properties in ink jet recording are likely to be further enhanced.

In the present specification, the surface tension can be measured as a surface tension when a platinum plate is wet with the ink 100 at normal temperature under normal pressure using a surface tension meter CBVP-Z (trade name, manufactured by Kyowa Interface Science, Co., Ltd.). Examples may be referred to for the specific measuring method thereof.

1.1.1.3. Viscosity of Ink 100

The viscosity of the ink 100 at 20° C. is preferably 1.5 mPa·s or greater and 15 mPa·s or less. Further, in the present specification, the viscosity can be measured by using a BL type viscometer.

1.1.1.4. Color Tone of Ink 100

From the viewpoint that the electrical conductivity of the ink composition can be further decreased, the height of the ink liquid face can be detected more accurately, and the ink remaining amount can be detected with higher precision, it is preferable that the ink 100 be a light color ink 100. In the present specification, the light color ink denotes an ink with a chroma saturation C* of 15 or less and includes a so-called achromatic ink.

1.1.2. Coloring Material

The ink 100 may contain a coloring material. Examples of the coloring material include a dye and a dispersed coloring material. The coloring material may be used alone or in combination of two or more kinds thereof.

From the viewpoint of detecting the height of the ink liquid face more accurately and detecting the ink remaining amount with higher precision, a dye is preferable, and a water-soluble dye is more preferable as the coloring material. The coloring material may be used alone or in combination of two or more kinds thereof.

1.1.2.1. Dye

The ink 100 may contain a dye as the coloring material. Examples of the dye include a water-soluble dye. Examples of the water-soluble dye include an acid dye, a reactive dye, and a direct dye. The dye may be used alone or in combination of two or more kinds thereof.

Examples of the acid dye include C.I. Acid Red 1, 6, 8, 9, 13, 14, 18, 19, 24, 26, 27, 28, 32, 35, 37, 42, 51, 52, 57, 62, 75, 77, 80, 82, 83, 85, 87, 88, 89, 92, 94, 95, 97, 106, 111, 114, 115, 117, 118, 119, 127, 128, 129, 130, 131, 133, 134, 138, 143, 145, 149, 151, 154, 155, 158, 168, 180, 183, 184, 186, 194, 198, 199, 209, 211, 215, 216, 217, 219, 249, 252, 254, 256, 257, 260, 261, 262, 263, 265, 266, 274, 276, 282, 283, 289, 299, 301, 303, 305, 315, 318, 320, 321, 322, 336, 337, 361, 396, and 397; C.I. Acid Violet 5, 7, 11, 31, 34, 35, 41, 43, 47, 48, 49, 51, 54, 66, 68, 75, 78, 97, 103, 106, and 126; C.I. Acid Yellow 1, 3, 7, 11, 17, 19, 23, 25, 29, 36, 38, 39, 40, 42, 44, 49, 50, 59, 61, 64, 72, 75, 76, 78, 79, 98, 99, 110, 111, 112, 114, 116, 118, 119, 127, 128, 131, 135, 141, 142, 143, 151, 159, 161, 162, 163, 164, 165, 169, 174, 184, 190, 195, 196, 197, 199, 207, 218, 219, 222, 227, and 246; C.I. Acid Blue 1, 7, 9, 15, 22, 23, 25, 27, 29, 40, 41, 43, 45, 49, 54, 59, 60, 62, 72, 74, 76, 78, 80, 82, 83, 87, 90, 92, 93, 100, 102, 103, 104, 106, 112, 113, 114, 117, 120, 126, 127, 127:1, 128, 129, 130, 131, 133, 138, 140, 142, 143, 151, 154, 156, 158, 161, 166, 167, 168, 170, 171, 175, 181, 182, 183, 184, 185, 187, 192, 193, 201, 203, 204, 205, 207, 209, 220, 221, 224, 225, 229, 230, 232, 239, 247, 249, 258, 260, 264, 271, 277, 277:1, 278, 279, 280, 284, 288, 290, 296, 298, 300, 317, 324, 326, 333, 335, 338, 342, and 350; C.I. Acid Black 1, 2, 7, 24, 26, 29, 31, 44, 48, 50, 51, 52, 52:1, 58, 60, 62, 63, 64, 67, 72, 76, 77, 94, 107, 108, 109, 110, 112, 115, 118, 119, 121, 122, 131, 132, 139, 140, 155, 156, 157, 158, 159, 172, 191, 194, and 234; C.I. Acid Orange 1, 7, 8, 10, 19, 20, 24, 28, 33, 41, 43, 45, 51, 56, 63, 64, 65, 67, 74, 80, 82, 85, 86, 87, 88, 94, 95, 122, 123, and 124; C.I. Acid Green 3, 7, 9, 12, 16, 19, 20, 25, 27, 28, 35, 36, 40, 41, 43, 44, 48, 56, 57, 60, 61, 65, 73, 75, 76, 78, and 79; and C.I. Acid Brown 2, 4, 13, 14, 19, 20, 27, 28, 30, 31, 39, 44, 45, 46, 48, 53, 100, 101, 103, 104, 106, 160, 161, 165, 188, 224, 225, 226, 231, 232, 236, 247, 256, 257, 266, 268, 276, 277, 282, 289, 294, 295, 296, 297, 298, 299, 300, 301, and 302.

Examples of the direct dye include C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243, and 247; C.I. Direct Violet 7, 9, 47, 48, 51, 66, 90, 93, 94, 95, 98, 100, and 101; C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 136, 142, 144, 161, and 163; C.I. Direct Blue 1, 10, 15, 22, 25, 41, 55, 67, 68, 71, 76, 77, 78, 80, 84, 86, 87, 90, 98, 106, 108, 109, 120, 151, 156, 158, 159, 160, 153, 168, 189, 192, 193, 194, 199, 200, 201, 202, 203, 207, 211, 213, 214, 218, 225, 226, 229, 236, 237, 244, 248, 249, 251, 252, 264, 270, 280, 288, 289, and 291; and C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, 195, and 199.

It is preferable that the ink composition contain C.I. Direct Yellow 86, C.I. Direct Yellow 136, and C.I. Direct Blue 199 as the direct dye. Since the electrical conductivity of the ink composition can be further decreased by using such direct dyes, the height of the ink liquid face can be detected more accurately, and the ink remaining amount can be detected with higher precision.

Examples of the reactive dye include C.I. Reactive Yellow 1, 2, 3, 5, 11, 13, 14, 15, 17, 18, 20, 21, 22, 23, 24, 25, 26, 27, 29, 35, 37, 40, 41, 42, 47, 51, 55, 65, 67, 81, 95, 116, 142, and 161; C.I. Reactive Red 1, 3, 3:1, 4, 13, 14, 17, 19, 21, 22, 23, 24, 24:1, 25, 26, 29, 31, 32, 35, 37, 40, 41, 43, 44, 45, 46, 49, 55, 60, 66, 74, 79, 96, 97, 108, 141, 180, 218, 226, and 245; C.I. Reactive Violet 1, 3, 4, 5, 6, 7, 8, 9, 16, 17, 22, 23, 24, 26, 27, 33, and 34; C.I. Reactive Blue 1, 2, 3, 5, 7, 8, 10, 13, 14, 15, 17, 18, 19, 21, 23, 25, 26, 27, 28, 29, 32, 35, 38, 41, 49, 63, 72, 80, 95, and 190; C.I. Reactive Orange 1, 2, 4, 5, 7, 12, 13, 14, 16, 20, 29, 33, 35, 38, 64, 67, 71, 72, 72:1, 78, 82, 84, 86, 87, 91, 99, 99:1, 107, 113, 122, 124, and 125; and C.I. Reactive Black 1, 3, 4, 5, 7, 8, 11, 12, 14, 17, 21, 23, 26, 31, 32, 34, 39.

It is preferable that the ink composition contain C.I. Reactive Red 14 as the reactive dye. Since the electrical conductivity of the ink composition can be further decreased by using C.I. Reactive Red 14, the height of the ink liquid face can be detected more accurately, and the ink remaining amount can be detected with higher precision.

Further, a yellow dye represented by Formula (1), a black dye represented by Formula (2), and a magenta dye represented by Formula (3) may be used as the water-soluble dye. It is preferable that such water-soluble dyes be used from the viewpoint that the electrical conductivity of the ink composition can be further decreased, the height of the ink liquid face can be detected more accurately, and the ink remaining amount can be detected with higher precision.

(1)

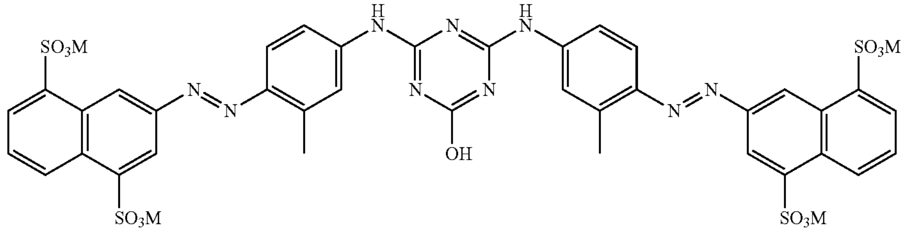

In Formula (1), M represents Na or Li.

(2)

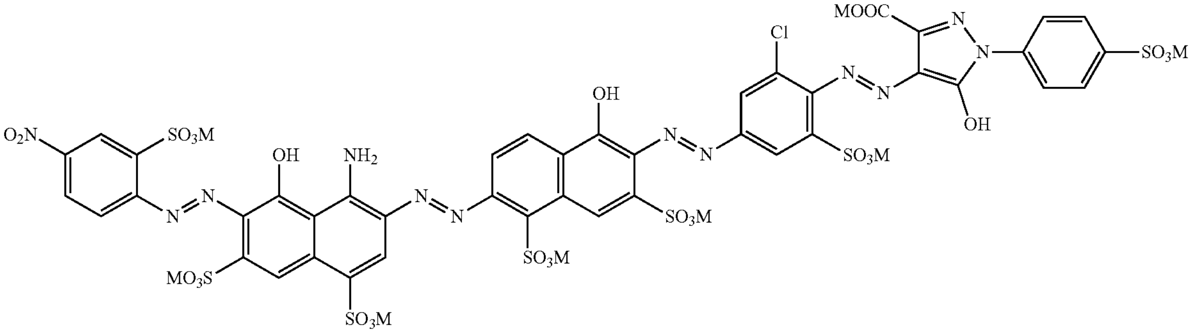

In Formula (2), M represents Li.

(3)

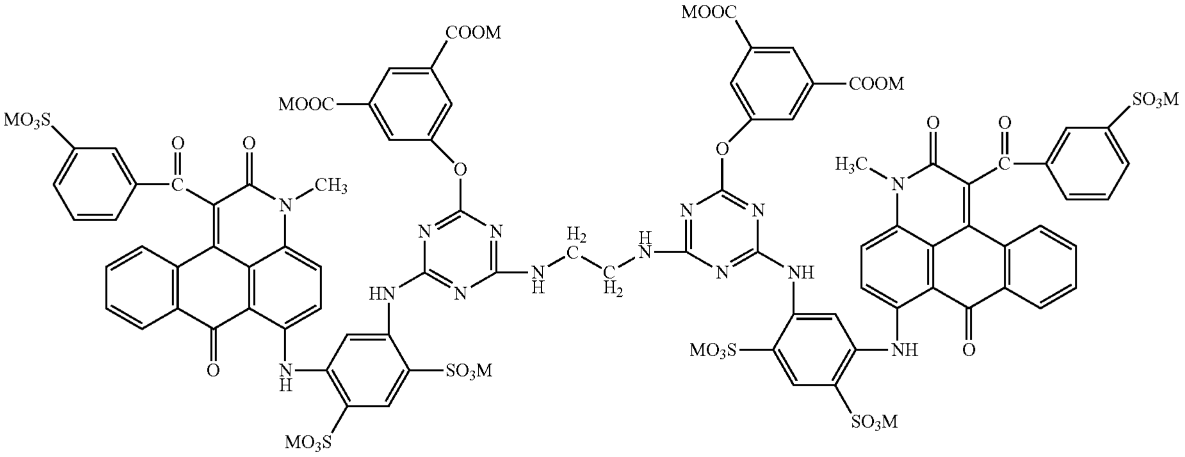

In Formula (3), M represents $NH_4$ or Na.

The content of the dye is preferably 5.0% by mass or less, more preferably 0.1% by mass or greater and 3.0% by mass or less, still more preferably 0.5% by mass or greater and 3.0% by mass or less, and particularly preferably 1.0% by mass or greater and 3.0% by mass or less with respect to the total amount of the ink 100. When the content of the dye is in the above-described ranges, since the electrical conductivity of the ink composition can be further decreased, the height of the ink liquid face can be detected more accurately, and the ink remaining amount can be detected with higher precision.

1.1.2.2. Dispersed Coloring Material

The ink 100 may contain a dispersed coloring material as the coloring material. Examples of the dispersed coloring material include an inorganic pigment, an organic pigment, an oil-soluble dye, and a dispersed dye. Further, the hues of the pigment and the dye are not particularly limited, and so-called process colors such as cyan, yellow, magenta, orange, green, and black or so-called special colors such as white, a fluorescent color, and a bright color may be used. The dispersed coloring material may be used alone or in combination of two or more kinds thereof.

It is preferable that the dispersed coloring material can be stably dispersed in the ink 100. The dispersed coloring material may be used as a self-dispersion type coloring material by oxidizing or sulfonating the surface of the coloring material with, for example, ozone, hypochlorous acid, or fuming sulfuric acid to modify the surfaces of the coloring material particles, or the dispersed coloring material may be used by being dispersed with a dispersant described below.

Examples of the inorganic pigment include carbon black such as furnace black, lamp black, acetylene black, or channel black, iron oxide, titanium oxide, zinc oxide, and silica.

Examples of the carbon black include No. 2300, 900, MCF88, No. 20B, No. 33, No. 40, No. 45, No. 52, MA7, MA8, MA100, and No. 2200B (manufactured by Mitsubishi Chemical Corporation); Color Black FW1, FW2, FW2V, FW18, FW200, S150, S160, S170, Printex 35, U, V, 140U, Special Black 6, 5, 4A, 4, and 250 (manufactured by Degussa AG); Conductex SC, Raven 1255, 5750, 5250, 5000, 3500, 1255, and 700 (manufactured by Columbia Carbon); REGAL 400R, 330R, 660R, Mogul L, Monarch 700, 800, 880, 900, 1000, 1100, 1300, 1400, and Elftex 12 (manufactured by Cabot Corporation); and BONJET BLACK CW-1, CW-1S, CW-2, CW-3, and M-800 (manufactured by Orient Chemical Industries Co., Ltd.).

Examples of the organic pigment include a quinacridone-based pigment, a quinacridone quinone-based pigment, a dioxazine-based pigment, a phthalocyanine-based pigment, an anthrapyrimidine-based pigment, an anthanthrone-based pigment, an indanthrone-based pigment, a flavanthrone-based pigment, a perylene-based pigment, a diketopyrrolo-pyrrole-based pigment, a perinone-based pigment, a quinophthalone-based pigment, an anthraquinone-based pigment, a thioindigo-based pigment, a benzimidazolone-based pigment, an isoindolinone-based pigment, an azomethine-based pigment, and an azo-based pigment.

Examples of the cyan pigment include C.I. Pigment Blue 1, 2, 3, 15:3, 15:4, 15:34, 16, 22, and 60; and C.I. Vat Blue 4 and 60.

Examples of the magenta pigment include C.I. Pigment Red 5, 7, 12, 48 (Ca), 48 (Mn), 57 (Ca), 57:1, 112, 122, 123, 168, 184, and 202, and C.I. Pigment Violet 19.

Examples of the yellow pigment include C.I. Pigment Yellow 1, 2, 3, 12, 13, 14C, 16, 17, 73, 74, 75, 83, 93, 95, 97, 98, 119, 110, 114, 128, 129, 138, 150, 151, 154, 155, 180, and 185.

Examples of the orange pigment include C.I. Pigment Orange 36 and 43.

Examples of the green pigment include C.I. Pigment Green 7 and 36.

Examples of the white pigment include a metal oxide, and a metal compound such as barium sulfate or calcium carbonate. Examples of the metal oxide include titanium dioxide, zinc oxide, silica, alumina, and magnesium oxide. Further, particles having a hollow structure may be used as the white pigment.

A bright pigment is not particularly limited as long as the pigment can exhibit brightness when adhering to a medium. Examples of such a pigment include metal particles such as aluminum, silver, gold, platinum, nickel, chromium, tin, zinc, indium, titanium, copper, and alloys thereof, and pearl pigments having pearl gloss. Examples of the pearl pigment include pigments having pearl gloss or interference gloss such as titanium dioxide-coated mica, fish scale guanine, and bismuth oxychloride. The bright pigment may be subjected to a surface treatment for suppressing the reaction with water.

A pigment that has been dispersed with a dispersant in advance may be used as the pigment.

Examples of such a dispersant include water-soluble resins such as a (meth)acrylic resin such as poly(meth) acrylic acid, a (meth)acrylic acid-acrylonitrile copolymer, a (meth)acrylic acid-(meth)acrylic acid ester copolymer, a vinyl acetate-(meth)acrylic acid ester copolymer, a vinyl acetate-(meth)acrylic acid copolymer, or a vinylnaphthalene-(meth)acrylic acid copolymer and a salt thereof; a styrene-based resin such as a styrene-(meth)acrylic acid copolymer, a styrene-(meth)acrylic acid-(meth)acrylic acid ester copolymer, a styrene-α-methylstyrene-(meth)acrylic acid copolymer, a styrene-α-methylstyrene-(meth)acrylic acid-(meth)acrylic acid ester copolymer, a styrene-maleic acid copolymer, or a styrene-maleic anhydride copolymer and a salt thereof; a polymer compound (resin) obtained by reacting an isocyanate group and a hydroxyl group and having a urethane bond; a urethane-based resin with or without a crosslinked structure and a salt thereof; polyvinyl alcohols; a vinylnaphthalene-maleic acid copolymer and a salt thereof; a vinyl acetate-maleic acid ester copolymer and a salt thereof; and a vinyl acetate-crotonic acid copolymer and a salt thereof.

The dispersant may be used alone or in combination of two or more kinds thereof. The content of the dispersant is typically 0.1 parts by mass or greater and 30 parts by mass or less with respect to 100 parts by mass of the pigment.

As the oil-soluble dye or the dispersed dye, any coloring material that is dispersed in an ink vehicle without being dissolved therein may be used. Examples of such a coloring material include an azo-based coloring material, a metal complex salt azo-based coloring material, an anthraquinone-based coloring material, a phthalocyanine-based coloring material, and a triallylmethane-based coloring material.

More specific examples of the dispersed dye include C.I. Disperse Red 60, 82, 86, 86:1, 92, 152, 154, 167:1, 191, and 279; C.I. Disperse Yellow 64, 71, 86, 114, 153, 163, 233, and 245; C.I. Disperse Blue 27, 60, 73, 77, 77:1, 87, 165, 165:1, 257, and 367; C.I. Disperse Violet 26, 33, 36, and 57; C.I. Disperse Orange 30, 41, 61, and 80.

From the viewpoint that the height of the ink liquid face can be detected more accurately and the ink remaining amount can be detected with higher precision, the content of the dispersed coloring material is preferably 0.1% by mass or greater and 3.0% by mass or less with respect to the total amount of the ink 100.

1.1.3. Surfactant

The ink 100 may contain a surfactant.

Examples of the surfactant include an acetylene glycol-based surfactant; an ether-based surfactant such as polyoxyethylene nonylphenyl ether, polyoxyethylene octylphenyl ether, polyoxyethylene dodecylphenyl ether, polyoxyethylene alkyl allyl ether, polyoxyethylene oleyl ether, polyoxyethylene lauryl ether, polyoxyethylene alkyl ether, or polyoxyalkylene alkyl ether; an ester-based surfactant such as polyoxyethylene oleic acid, polyoxyethylene oleic acid ester, polyoxyethylene distearic acid ester, sorbitan laurate, sorbitan monostearate, sorbitan monooleate, sorbitan sesquioleate, polyoxyethylene monooleate, or polyoxyethylene stearate; a silicone-based surfactant; and a fluorine-based surfactant such as fluorine alkyl ester or perfluoroalkyl carboxylate. The surfactant may be used alone or in combination of two or more kinds thereof.

It is preferable that the ink 100 contain an acrylene glycol-based surfactant as the surfactant. When the ink 100 contains an acetylene glycol-based surfactant, the wettability on the member constituting the inner wall surface of the accommodation space 20 can be more suitably controlled. Therefore, the inner wall surface is difficult to be wet with the ink 100, a concave meniscus is difficult to form, and the ink 100 is difficult to remain on the liquid face even when the liquid face of the ink 100 is dropped as the ink 100 is consumed. In this manner, since erroneous detection in the capacitance type detection can be more suitably suppressed, the height of the liquid face of the ink 100 can be detected more accurately, and the remaining amount of the ink 100 can be detected with higher precision.

Examples of commercially available products of the acetylene glycol-based surfactant include SURFYNOL (registered trademark) 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (manufactured by Nissin Chemical Co., Ltd.); OLFINE (registered trademark), B, Y, P, A, STG, SPC, E1004, E1010, PD-001, PD-002W, PD-003, PD-004, EXP. 4001, EXP. 4036, EXP. 4051, EXP. 4123, AF-103, AF-104, AK-02, SK-14, and AE-3 (manufactured by Nissin Chemical Co., Ltd.); and ACETYLENOL (registered trademark) E00, E00P, E40, and E100 (manufactured by Kawaken Fine Chemicals Co., Ltd.).

The content of the acetylene glycol-based surfactant is preferably 0.01% by mass or greater and 10% by mass or less, more preferably 0.05% by mass or greater and 5.0% by mass or less, and still more preferably 0.1% by mass or greater and 1.5% by mass or less with respect to the total amount of the ink 100. When the content of the acetylene glycol-based surfactant is in the above-described ranges, since the wettability on the member constituting the inner wall surface of the accommodation space 20 is more suitably controlled, the height of the liquid face of the ink 100 can be detected more accurately, and the remaining amount of the ink 100 can be detected with higher precision.

Examples of the silicone-based surfactant include a polysiloxane-based compound such as polyether-modified organosiloxane. Examples of commercially available products of the polyether-modified organosiloxane include BYK (registered trademark)-306, BYK-307, BYK-333, BYK-341, BYK-345, BYK-346, and BYK-348 (manufactured by BYK-Chemie Japan K.K.); and KF-351A, KF-352A, KF-353, KF-354L, KF-355A, KF-615A, KF-945, KF-640, KF-642, KF-643, KF-6004, KF-6020, X-22-4515, KF-6011, KF-6012, KF-6015, and KF-6017 (manufactured by Shin-Etsu Chemical Co., Ltd.).

Examples of commercially available products of the fluorine-based surfactant include BYK (registered trademark)-340 (manufactured by BYK-Chemie Japan K.K.).

From the viewpoint that the height of the ink liquid face can be detected more accurately and the ink remaining amount can be detected with higher precision, the content of the surfactant is preferably 0.01% by mass or greater and 10% by mass or less, more preferably 0.05% by mass or greater and 5.0% by mass or less, and still more preferably 0.1% by mass or greater and 1.5% by mass or less with respect to the total amount of the ink 100.

1.1.4 Organic Solvent

The ink 100 may contain an organic solvent.

From the viewpoint that the height of the ink liquid face can be detected more accurately and the ink remaining amount can be detected with higher precision, it is preferable that the organic solvent have water solubility. The organic solvent has, for example, a function of improving the wettability of the ink 100 with respect to a recording medium and a function of enhancing moisture retaining properties of the ink 100. Further, the organic solvent also functions as a penetrating agent.

Examples of the organic solvent include esters, alkylene glycol ethers, cyclic esters, nitrogen-containing solvents, and polyhydric alcohol. Examples of the nitrogen-containing solvents include cyclic amides and acyclic amides. Examples of the acyclic amides include alkoxyalkylamide. The organic solvent may be used alone or in combination of two or more kinds thereof.

Examples of the esters include glycol monoacetates such as ethylene glycol monomethyl ether acetate, ethylene glycol monoethyle ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxybutyl acetate, and glycol diesters such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, diethylene glycol acetate butyrate, propylene glycol acetate propionate, propylene glycol acetate butyrate, dipropylene glycol acetate butyrate, and dipropylene glycol acetate propionate.

A monoether or a diether of alkylene glycol may be used as the alkylene glycol ethers, and alkyl ether is preferable. Specific examples thereof include alkylene glycol monoalkyl ethers such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, and tripropylene glycol monobutyl ether, and alkylene glycol dialkyl ethers such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether.

Further, a diether of the alkylene glycol is more preferable to a monoether of the alkylene glycol in terms that the resin particles are likely to be dissolved or swollen in the ink and the rub resistance of an image to be formed is improved.

Examples of the cyclic esters include cyclic esters (lactones) such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalacctone, ε-nonalactone, and ε-decanolactone, and a compound in which hydrogen of a methylene group adjacent to a carbonyl group is substituted with an alkyl group having 1 or more and 4 or less carbon atoms.

Examples of the alkoxyalkylamides include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, and 3-tert-butoxy-N,N-methylethylpropionamide.

Examples of the cyclic amides include lactams. Specific examples thereof include pyrrolidones such as 2-pyrrolidone, 1-methyl-2-pyrrolidone, 1-ethyl-2-pyrrolidone, 1-propyl-2-pyrrolidone, 1-butyl-2-pyrrolidone, ε-caprolactam, 1-(2-hydroxyethyl)-2-pyrrolidone, and N-vinyl-2-pyrrolidone.

Examples of the polyhydric alcohol include alkanediols such as ethylene glycol, propylene glycol, 1,2-butanediol, 1,2-pentanediol, 1,2-hexanediol, 1,2-heptanediol, and 1,2-octanediol; and polyols excluding alkanediols, such as diethylene glycol, dipropylene glycol, triethylene glycol, 1,3-propanediol, 1,3-butanediol, 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylolpropane, and glycerin.

The alkanediols and the polyols can function mainly as a penetrating agent and/or a moisturizing agent. The alkanediols have strong properties as a penetrating agent, and the polyols have strong properties as a moisturizing agent. Examples of the organic solvent having strong properties as a moisturizing agent include glycerin.

From the viewpoint that the height of the ink liquid face can be detected more accurately and the ink remaining amount can be detected with higher precision, it is preferable that the ink contain one or more selected from the group consisting of alkylene glycol ethers and polyhydric alcohol as the organic solvent. Glycerin is more preferable as the polyhydric alcohol.

From the viewpoint that the height of the ink liquid face can be detected more accurately and the ink remaining amount can be detected with higher precision, the content of the organic solvent is preferably 0.1% by mass or greater and 50% by mass or less, more preferably 0.5% by mass or greater and 45% by mass or less, still more preferably 1% by mass or greater and 40% by mass or less, and particularly preferably 2% by mass or greater and 30% by mass or less with respect to the total amount of the ink 100.

1.1.5. pH Adjusting Agent

The ink 100 may contain a pH adjusting agent. When the ink 100 contains a pH adjusting agent, the storage stability of the ink 100 is likely to be further improved.

Examples of the pH adjusting agent include appropriate combinations of acids, bases, weak acids, and weak bases. Examples of the acids and bases used in combination include inorganic acids such as sulfuric acid, hydrochloric acid, and nitric acid; inorganic bases such as lithium hydroxide, sodium hydroxide, potassium hydroxide, potassium dihydrogen phosphate, disodium hydrogen phosphate, potassium carbonate, sodium carbonate, sodium hydrogen carbonate, and ammonia; organic bases such as triethanolamine, diethanolamine, monoethanolamine, tripropanolamine, triisopropanolamine, diethanolamine, monoethanolamine, tripropanolamine, triisopropanolamine, diisopropanolamine, and trishydroxymethylaminomethane (THAM); and organic acids such as adipic acid, citric acid, succinic acid, lactic acid, a good buffer such as N,N-bis(2-hydroxyethyl)-2-aminoethanesulfonic acid (BES), 4-(2-hydroxyethyl)-1-piperazine ethanesulfonic acid (HEPES), morpholinoethanesulfonic acid (MES), morpholinopropanesulfonic acid (MOPS), carbamoylmethyliminobisacetic acid (ADA), piperazine-1,4-bis(2-ethanesulfonic acid) (PIPES), N-(2-acetamido)-2-aminoethanesulfonic acid (ACES), colamine hydrochloride, N-tris(hydroxymethyl)methyl-2-aminoethanesulfonic acid (TES), acetamidoglycine, tricine, glycinamide, or bicine, a phosphate buffer, a citrate buffer, and a tris buffer. Further, from the viewpoint of more stably obtaining the pH buffering effect, it is preferable that the pH adjusting agent contain, as a part or the entirety thereof, a tertiary amine such as triethanolamine or triisopropanolamine; and a carboxyl group-containing organic acid such as adipic acid, citric acid, succinic acid, or lactic acid. The pH adjusting agent may be used alone or in combination of two or more kinds thereof.

The content of the pH adjusting agent is preferably 1.0% by mass or less and more preferably 0.05% by mass or greater and 0.5% by mass or less with respect to the total amount of the ink 100. When the content of the pH adjusting agent is in the above-described range, the storage stability of the ink 100 is likely to be further improved. Further, since the electrical conductivity of the ink composition can be further decreased, the height of the ink liquid face can be detected more accurately, and the ink remaining amount can be detected with higher precision.

1.1.6. Water

The ink 100 may contain water.

Water is a component evaporated and scattered by being dried. Water obtained by removing ionic impurities as much as possible, for example, pure water such as ion exchange water, ultrafiltered water, reverse osmosis water, or distilled water, or ultrapure water is preferable as water. Further, it is suitable that water sterilized by irradiation with ultraviolet rays, addition of hydrogen peroxide, or the like is used from the viewpoint of suppressing occurrence of mold or bacteria when the ink 100 is stored for a long time.

The content of water is preferably 45% by mass or greater, more preferably 50% by mass or greater and 98% by mass or less, and still more preferably 55% by mass or greater and 95% by mass or less with respect to the total amount of the ink 100.

1.1.7. Other Components

The ink 100 may contain, as other components, resin particles, chelating agents, ureas, preservatives, fungicides, saccharides, and components other than the above-described components. Other components may be used alone or in combination of two or more kinds thereof.

1.1.7.1. Resin Particles

The ink 100 may contain resin particles.

The adhesiveness of an image formed of the ink 100 adhering to a recording medium can be further improved by using the resin particles.

Examples of the resin particles include a urethane-based resin, an acrylic resin (including a styrene acrylic resin), a fluorene-based resin, a polyolefin-based resin, a rosin-modified resin, a terpene-based resin, a polyester-based resin, a polyamide-based resin, an epoxy-based resin, a vinyl chloride-based resin, a vinyl chloride-vinyl acetate copolymer, and an ethylene-vinyl acetate resin. The resin particles may be in the form of an emulsion. The resin particles may be used alone or in combination of two or more kinds thereof.

The content of the resin particles is preferably 0.1% by mass or greater and 20% by mass or less with respect to the total amount of the ink 100 in terms of the solid content.

1.1.7.2. Chelating Agent

The ink 100 may contain a chelating agent

The chelating agent is capable of removing predetermined ions in the ink 100.

Examples of the chelating agent include ethylenediaminetetraacetic acid such as ethylenediaminetetraacetic acid (EDTA), ethylenediaminetetraacetic acid disodium salt (EDTA-2Na), ethylenediaminetetraacetic acid trisodium salt (EDTA-3Na), ethylenediaminetetraacetic acid tetrasodium salt (EDTA-4Na), or ethylenediaminetetraacetic acid tripotassium salt (EDTA-3K), and salts thereof; diethylenetriaminepentaacetic acid such as diethylenetriaminepentaacetic acid (DTPA), diethylenetriaminepentaacetic acid disodium salt (DTPA-2Na), or diethylenetriaminepentaacetic acid pentasodium salt (DTPA-5Na), and salts thereof; nitrilotriacetic acid such as nitrilotriacetic acid (NTA), nitrilotriacetic acid disodium salt (NTA-2Na), or nitrilotriacetic acid trisodium salt (NTA-3Na) and salts thereof; ethylenediamine-N,N'-disuccinic acid and salts thereof; 3-hydroxy-2,2'-iminodisuccinic acid and salts thereof; L-aspartic acid-N,N'-diacetic acid and salts thereof; L-glutamic acid diacetic acid and salts thereof; N-(1-carboxylatomethyl)iminodiacetic acid and salts thereof; N-(2-hydroxyethyl)iminodiacetic acid and salts thereof; ethylenediaminetetramethylenephosphonic acid and salts thereof; ethylenediaminetetrametaphosphoric acid and salts thereof; ethylenediaminepyrophosphoric acid and salts thereof; and ethylenediaminemetaphosphoric acid and salts thereof. The chelating agent may be used alone or in combination of two or more kinds thereof.

The content of the chelating agent is preferably 0.1% by mass or greater and 10% by mass or less with respect to the total amount of the ink 100.

1.1.7.3. Ureas

The ink 100 may contain ureas.

The ureas function as a moisturizing agent of the ink 100 or as a dyeing assistant that improves the dyeing properties of the dye.

Examples of the ureas include urea, ethyleneurea, tetramethylurea, thiourea, and 1,3-dimethyl-2-imidazolidinone. The ureas may be used alone or in combination of two or more kinds thereof.

The content of the ureas is preferably 0.1% by mass or greater and 10% by mass or less with respect to the total amount of the ink 100.

1.1.7.4. Preservative, Fungicide, and Rust Inhibitor

The ink 100 may contain one or more selected from the group consisting of a preservative, a fungicide, and a rust inhibitor.

Examples of the preservative and the fungicide include sodium benzoate, sodium pentachlorophenol, sodium 2-pyridinethiol-1-oxide, sodium sorbate, sodium dehydroacetate, 1,2-dibenzoisothiazolin-3-one (CRL, BDN, GXL, XL-2, TN, and LV (all trade names) of PROXEL (registered trademark) series, manufactured by Zeneca Ltd.), and 4-chloro-3-methylphenol (PREVENTOL (registered trademark) CMK (trade name), manufactured by Bayer AG). Examples of the rust inhibitor include benzotriazole.

1.1.7.5. Saccharides

The ink 100 may contain saccharides.

Saccharides are capable of suppressing solidification and drying of the ink 100.

Examples of the saccharides include glucose, mannose, fructose, ribose, xylose, arabinose, galactose, aldonic acid, glucitol (sorbit), maltose, cellobiose, lactose, sucrose, trehalose, and maltotriose. The saccharides may be used alone or in combination of two or more kinds thereof.

1.1.7.6. Other Components

The ink 100 may contain additives that can be typically used in an ink jet ink composition for ink jet, such as a viscosity adjusting agent, an antioxidant, an ultraviolet absorbing agent, an oxygen absorbing agent, and a dissolution assistant, as necessary.

1.1.8. Method of Producing Ink 100

The ink 100 can be prepared by mixing the above-described components in any order and performing filtration or the like as necessary to remove impurities and foreign matter. As a method of mixing each component, a method of sequentially adding each component to a container equipped with a stirring device such as a mechanical stirrer or a magnetic stirrer and stirring and mixing the mixture is used. Examples of the filtration method include centrifugal filtration and filter filtration.

1.2. Outline of Ink Jet Recording Device

Figure 4:
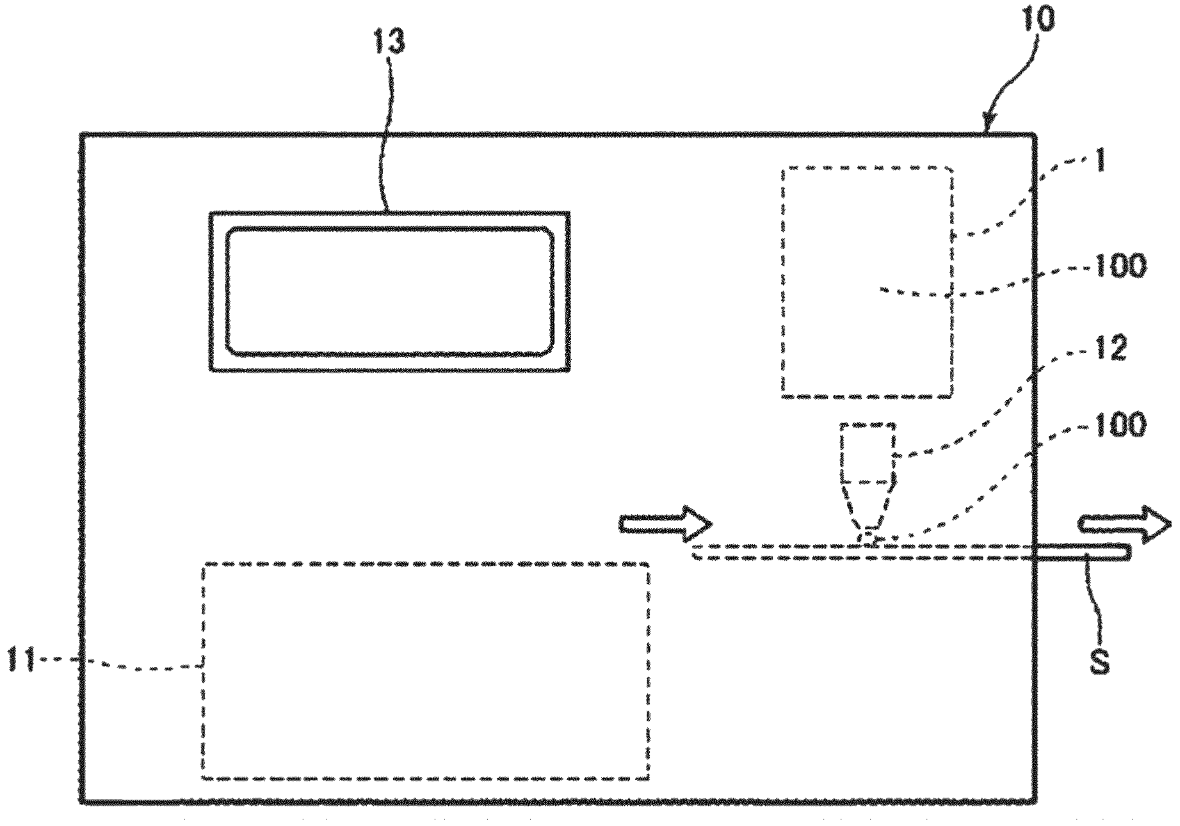
FIG. 4 is a schematic configuration view showing an example of an ink jet recording device according to the present embodiment.

The ink jet recording device 10 according to the present embodiment will be described with reference to the schematic configuration view of FIG. 4. Further, in the present embodiment, a case where the ink amount detection device 1 is incorporated in the recording device 10 will be described as an example.

The recording device 10 includes a storage unit 11 storing a sheet S as printing paper, an ink jet head jetting the ink 100 to the sheet S supplied from the storage unit 11, the ink amount detection device 1, and a display unit 13. Further, the ink 100 is supplied to the ink jet head 12 from the ink amount detection device 1.

As described below, the display unit 13 functions as a notification unit that notifies a user of the remaining amount of the ink 100 detected by the ink amount detection device 1. The display unit 13 is, for example, configured of a liquid crystal screen or the like. Further, the display unit is not limited to the above-described display unit 13 and may be configured to notify by a voice, configured to notify by vibration, or configured to notify using a blinking pattern of a lamp. Further, a device having a communication function such as a PC screen or a smartphone may function as the notification unit.

Since the ink amount detection device 1 is incorporated in such a recording device 10, the remaining amount of the ink 100 can be detected accurately as described below, and the user can accurately grasp the remaining amount of the ink 100.

1.3. Ink Amount Detection Device

As shown in FIGS. 1 and 5 to 8, the ink amount detection device 1 according to the present embodiment includes the container 2 internally having the accommodation space 20 that accommodates the ink 100, the first electrode 3 and at least one second electrode 4 disposed to face each other via the accommodation space 20, and a capacitance detection unit 50 detecting the capacitance between the first electrode 3 and the second electrode 4 using a mutual capacity method. The ink amount detection device 1 may include a control unit 6. Further, the control unit 6 may also function as a control unit that controls each unit of the recording device 10.

The container 2 internally has the accommodation space 20 and is capable of accommodating the ink 100, which is a detection target, in the accommodation space 20. The z-axis direction is the depth direction in the container 2, and the container 2 has a bottomed cylindrical shape. That is, as shown in FIG. 1, the container 2 includes a bottom plate 21 positioned on the −z-axis side and four side walls 22, 23, 24, and 25 standing to protrude from the bottom plate 21 toward the +z-axis side. The space surrounded by the bottom plate 21 and the side walls 22 to 25 is the accommodation space 20.

Although not shown, the container 2 has a top plate on a side opposite to the bottom plate 21, that is, on the +z-axis side of the side walls 22 to 25. The top plate may be bonded to the side walls 22 to 25 or may be configured to be attachable to or detachable from the side walls.

The bottom plate 21 is a plate member bonded to the side walls 22 to 25 on the −z-axis side. Further, the bottom plate 21 has a discharge port 211 as a discharge portion formed of a through-hole. In this manner, the ink 100 in the accommodation space 20 can be discharged to the outside of the container 2. Further, the discharge port 211 is coupled to the ink jet head 12 via a conduit (not shown). The ink 100 discharged from the discharge port 211 is supplied to the ink jet head 12 shown in FIG. 2 via a conduit, and printing is performed on the sheet S.

Further, when the ink 100 is discharged from the discharge port 211, the ink 100 in the accommodation space drops so that the liquid face moves to the −z-axis side while maintaining a state in which the liquid face is in the horizontal direction.

Further, the ink 100 as a detection target is a liquid with fluidity. The container 2 has the discharge port 211 serving as a discharge portion that discharges the ink 100 as a detection target. In this manner, when the ink 100 in the container 2 is discharged and the amount thereof is gradually decreased, the user needs to grasp the remaining amount of the ink 100 in the container 2. When the user grasps the remaining amount of the ink, it is possible to prevent the ink 100 from running out at an unintended timing.

Further, the discharge port 211 may be provided at a portion other than the bottom plate 21, for example, at any of the side walls 22 to 25 in the vicinity of the bottom plate 21. Further, the configuration is not limited to a configuration having the discharge port 211, and for example, a configuration in which a tube or the like is inserted into the accommodation space 20 from a portion other than the bottom plate 21 to suck the ink 100 in the container 2 may be employed. In this case, the tube functions as the discharge port.

The side wall 22 stands on the +z-axis side from an edge of the bottom plate 21 on the −x-axis side. Further, the side wall 22 has a plate shape in which the x-axis direction is the thickness direction. Further, three electrodes, second electrodes 4A to 4C, are disposed on the outer surface side of the side wall 22, that is, the surface side on the −x-axis side.

The side wall 23 stands on the +z-axis side from an edge of the bottom plate 21 on the −y-axis side. Further, the side wall 23 has a plate shape in which the y-axis direction is the thickness direction.

The side wall 24 stands on the +z-axis side from an edge of the bottom plate 21 on the +x-axis side. Further, the side wall 24 has a plate shape in which the x-axis direction is the thickness direction. Further, the first electrode 3 is disposed on the side wall 22 on the outer surface side, that is, the surface side on the +x-axis side.

The side wall 25 stands on the +z-axis side from an edge of the bottom plate 21 on the +y-axis side. Further, the side wall 25 has a plate shape in which the y-axis direction is the thickness direction.

The side wall 22 and the side wall 24 are separated from each other in the x-axis direction and disposed to face each other in parallel. The dimensions and the shapes of the side wall 22 and the side wall 24 are the same as each other. The side wall 23 and the side wall 25 are separated from each other in the y-axis direction and disposed to face each other in parallel. The dimensions and the shapes of the side wall 23 and the side wall 25 are the same as each other. The external shape of the container 2 is a rectangular parallelepiped.

Further, the side walls 22 to 25 are flat plates. However, at least a part thereof may be curved or bent.

Further, it is preferable that the length of the side wall 23 and the side wall 25 in the x-axis direction, that is, a separation distance D between the first electrode 3 and the second electrode 4 described below be shorter than a length y3 of the side wall 22 and the side wall 24 in the y-axis direction. In this manner, the maximum capacitance of first to third condensers Ca to Cc described below can be sufficiently ensured, and the detection precision for the remaining amount of the ink 100 can be enhanced.

The separation distance D is preferably 5 mm or greater and 100 mm or less and more preferably 10 mm or greater and 50 mm or less. In this manner, the above-described effects can be more reliably exhibited.

The length y3 of the side wall 22 and the side wall 24 in the y-axis direction is preferably 20 mm or greater and 200 mm or less and more preferably 30 mm or greater and 150 mm or less. In this manner, the above-described effects can be more reliably exhibited.

The material constituting the container 2 is not particularly limited as long as the material does not allow permeation of the ink 100 and is formed of a dielectric. The container 2 is formed of, for example, a plastic plate consisting of mainly a synthetic resin such as polypropylene, and the plastic plate may be partially formed of a flexible member. Examples of the flexible member include a film formed of materials, for example, polyolefin such as polyethylene or polypropylene; polyamide; polyester such as polyethylene terephthalate; a vinyl-based copolymer such as vinyl acetate or vinyl chloride; and a metal such as aluminum or alumina or a metal oxide thereof, and the materials may be used alone or in combination. From the viewpoint that the static contact angle between the ink 100 and the member constituting the inner wall surface of the accommodation space 20 can be more easily set to 50° or greater, polypropylene is preferable as the material constituting the container 2. Further, it is preferable that at least a part of the container 2 be transparent or semitransparent. In this manner, the state of the ink inside the container 2 can be confirmed. It is more preferable that the side wall 23 and the side wall 25 have internal visibility.

The relative dielectric constant of the material constituting the container 2 is preferably 1 or greater and more preferably 2 or greater. In this manner, the remaining amount of the ink 100 is easily detected.

Figure 5:
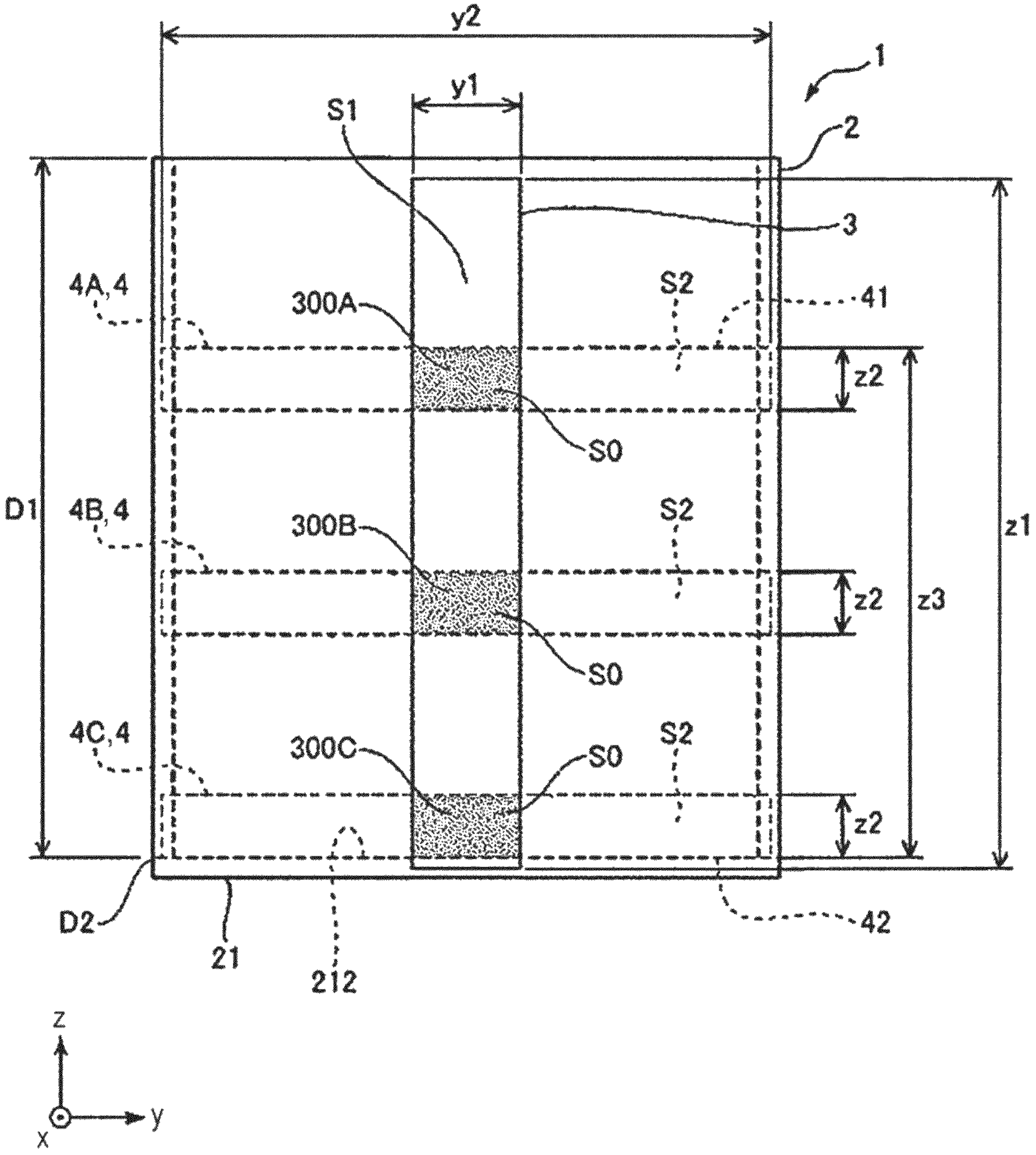
FIG. 5 is a view showing the container of FIG. 1 when viewed in an x-axis direction.

The first electrode 3 and at least one second electrode 4 are disposed on the outside of the container 2. As shown in FIGS. 1 and 5, the first electrode 3 and the second electrode 4 face each other in parallel in the x-axis direction.

It is preferable that the first electrode 3 have an elongated shape extending in the z-axis direction, as described below. Further, the second electrode 4 is operated alone, but it is preferable that a plurality of the second electrodes 4 be provided in a state of being separated from each other in the z-axis direction. In this manner, the remaining amount of the ink 100 can be detected in a stepwise manner as described below. Further, the capacitance can be detected at a plurality of heights, the remaining amount of the ink 100 can be detected with higher precision. Further, according to the present embodiment, since the static contact angle between the ink 100 and the member constituting the inner wall surface of the accommodation space 20 is large even when a plurality of the electrodes are present in the z-axis direction, the risk of erroneously detecting the ink 100 at a position higher than the actual height of the liquid face can be reduced.

In an example shown in FIGS. 1 and 5, three second electrodes 4 are provided. Further, these electrodes are referred to as a second electrode 4A, a second electrode 4B, and a second electrode 4C. In addition, the second electrodes 4A to 4C are disposed in this order from the +z-axis side in a state of being separated from each other in the z-axis direction. Further, the second electrodes 4A to 4C are disposed in parallel with each other.

As shown in FIG. 5, the first electrode 3 and the second electrodes 4A to 4C are projected in the x-axis direction, that is, when viewed in the x-axis direction, the first electrode 3 and the second electrodes 4A to 4C form three regions that overlap each other. Further, a region where the first electrode 3 and the second electrode 4A overlap each other is referred to as an effective region 300A, a region where the first electrode 3 and the second electrode 4B overlap each other is referred to as an effective region 300B, and a region where the first electrode 3 and the second electrode 4C overlap each other is referred to as an effective region 300C. These effective regions 300A to 300C are arranged in this order from the +z-axis side in a state of being separated from each other in the x-axis direction.

Figure 7:
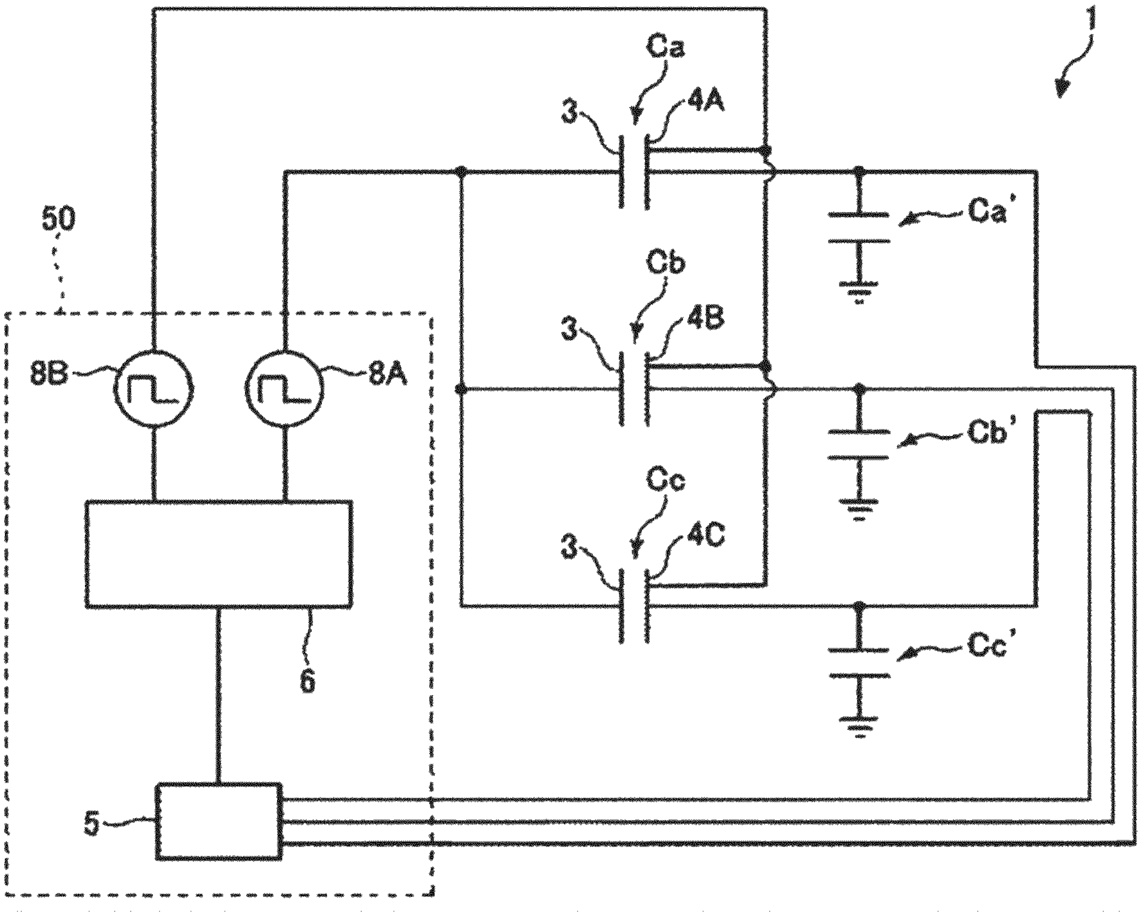
FIG. 7 is a circuit view showing the ink amount detection unit in the ink jet recording device according to the present embodiment.

The portion corresponding to the effective region 300A of the first electrode 3 and the second electrode 4A, that is, the portion forming the effective region 300A of the first electrode 3 and the second electrode 4A constitutes the first condenser Ca in an equivalent circuit shown in FIG. 7. The portion corresponding to the effective region 300B of the first electrode 3 and the second electrode 4B, that is, the portion forming the effective region 300B of the first electrode 3 and the second electrode 4B constitutes the second condenser Cb in an equivalent circuit shown in FIG. 7. The portion corresponding to the effective region 300C of the first electrode 3 and the second electrode 4C, that is, the portion forming the effective region 300C of the first electrode 3 and the second electrode 4C constitutes the first condenser Cc in an equivalent circuit shown in FIG. 7. The first to third condensers Ca to Cc are capacitors and shown as the equivalent circuit of FIG. 7. The details thereof will be described below.

First, the configuration of the first electrode 3 will be described.

Figure 6:
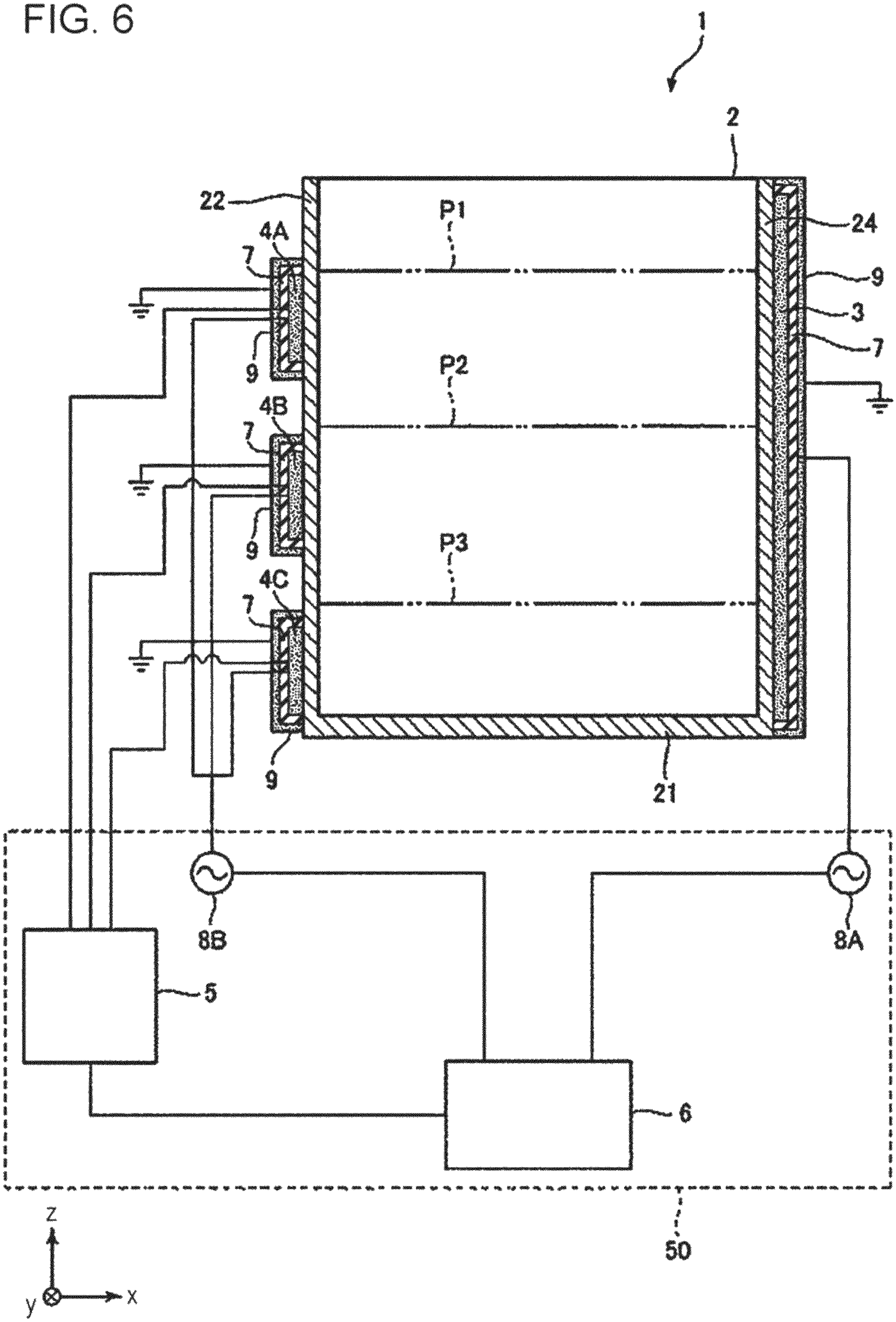
FIG. 6 is a view showing the container of FIG. 1 when viewed in a y-axis direction and also showing electrical coupling to a capacitance detection unit.

The first electrode 3 is a transmission electrode to which a pulse voltage is applied from a first power supply 8A described below. As shown in FIGS. 1, 5, and 6, the first electrode 3 is disposed on the outside of the side wall 24, that is, on the +x-axis side. The first electrode 3 is formed of a material having conductivity, for example, a metal material such as gold, silver, copper, aluminum, iron, nickel, cobalt, or an alloy thereof. The first electrode 3 may be formed directly on the outer surface of the side wall 24 by, for example, plating, vapor deposition, printing, or the like, may be attached to the outer surface of the side wall 24 via a pressure sensitive adhesive layer (not shown), or may be supported by the side wall 24 using a support member (not shown) in a contact or non-contact manner.

The first electrode 3 has an elongated shape extending in the z-axis direction. As shown in FIG. 5, the width of the first electrode 3, that is, the length y1 thereof in the y-axis direction is constant in the z-axis direction. The length y1 is, for example, preferably 2 mm or greater and 100 mm or less and more preferably 5 mm or greater and 50 mm or less. In this manner, the size of the effective regions 300A to 300C is likely to be sufficiently ensured, and the precision in detecting the remaining amount of the ink 100 can be enhanced.

Further, the length of the first electrode 3, that is, the length z1 thereof in the z-axis direction is, for example, preferably 3 mm or greater and 100 mm or less and more preferably 5 mm or greater and 200 mm or less. In this manner, when the first electrode 3 is viewed in the x-axis direction, the first electrode 3 can reliably overlap with each of the second electrodes 4A to 4C. Further, the areas of the effective regions 300A to 300C can be set to be the same as each other.

Further, an area S1 of the shape of the first electrode 3 in plan view in the x-axis direction is preferably 6 $mm^2$ or greater and 30000 $mm^2$ or less and more preferably 25 $mm^2$ or greater and 10000 $mm^2$ or less. In this manner, the size of the effective regions 300A to 300C is likely to be sufficiently ensured, and the precision in detecting the remaining amount of the ink 100 can be enhanced.

Further, an end portion of the first electrode on the −z-axis side is positioned on the −z-axis side with respect to the bottom surface 212 facing the accommodation space 20 of the container 2. There is a concern that the area of the effective region 300C where the first electrode 3 and the second electrode 4C overlap each other is decreased depending on the position of the second electrode 4C when assuming that the end portion of the first electrode 3 on the −z-axis side is positioned on the +z-axis side with respect to the bottom surface 212 facing the accommodation space 20 of the container. On the contrary, with the above-described configuration, the area of the effective region 300C can be ensured as large as possible when the ink amount detection device 1 is used. Therefore, the precision in detecting the remaining amount of the ink 100 can be enhanced.

In the configuration shown in the figure, an end portion of the first electrode 3 is positioned on the −z-axis side with respect to the edge of the side wall 24 on the +z-axis side. However, the position thereof is not limited thereto, the end portion of the first electrode 3 on the +z-axis side may coincide with the edge of the side wall 24 on the +z-axis side.

In the configuration shown in the figure, the first electrode 3 has an elongated shape extending in the z-axis direction, but the present disclosure is not limited thereto, and the first electrode 3 may have a shape that satisfies a relationship of "$y1 \geq z1$" depending on the shape of the side wall 24. Further, portions of the first electrode 3 other than the portions forming the effective regions 300A to 300C may be divided.

Next, the second electrodes 4A to 4C will be described.

The second electrodes 4A to 4C are reception electrodes and are disposed on the surface of the side wall 22 on the outside, that is, on the −x-axis side. The second electrodes 4A to 4C each have an elongated shape extending in the y-axis direction. The second electrodes 4A to 4C are disposed in this order from the +z-axis side in a state of being separated from each other in the z-axis direction. Further, the second electrodes 4A to 4C are provided in parallel.

As shown in FIGS. 1, 5, and 6, the second electrode 4A to 4C are disposed on the outside of the side wall 22, that is, on the −x-axis side. The second electrodes 4A to 4C can be formed by the same forming method using the same material as described in the section of the first electrode 3.

The second electrodes 4A to 4C are formed in the same shape with the same dimensions at the same interval, and thus the second electrode 4A will be representatively described below. However, the present disclosure is not limited thereto, and at least one of the shapes, the dimensions, or the intervals may be set to be different from each other.

In the present embodiment, as shown in FIG. 5, the length of the second electrode 4A, that is, the length y2 thereof in the y-axis direction is greater than the length y1 of the first electrode 3 in the y-axis direction and is, for example, preferably 3 mm or greater and 110 mm or less and more preferably 6 mm or greater and 60 mm or less. In this manner, the size of the effective regions 300A to 300C is likely to be sufficiently ensured, and the precision in detecting the remaining amount of the ink 100 can be enhanced.

Further, in the present embodiment, the width of the second electrode 4A, that is, the length z2 thereof in the z-axis direction is less than the length z1 of the first electrode 3 and is, for example, preferably 0.2 mm or greater and 10 mm or less and more preferably 0.5 mm or greater and 5 mm or less. In this manner, all the second electrodes 4A to 4C can overlap with the first electrode 3 as much as possible when viewed in the x-axis direction. Further, the areas of the effective regions 300A to 300C can be set to be the same as each other.

Further, the area S2 of the shape of the second electrode 4A in plan view when viewed in the x-axis direction is preferably 0.6 $mm^2$ or greater and 1100 $mm^2$ or less and more preferably 3 $mm^2$ or greater and 300 $mm^2$ or less. In this manner, the size of the effective regions 300A to 300C is likely to be sufficiently enhanced, and the precision in detecting the remaining amount of the ink 100 can be enhanced.

Further, in the configuration shown in the figure, the end portion of the second electrode 4A on the +y-axis side coincides with the edge of the side wall 22 on the +y-axis side. Here, the configuration is not limited thereto, and the end portion of the second electrode 4A on the +y-axis side may be positioned on the −y-axis side with respect to the edge of the side wall 22 on the +y-axis side.

Further, in the configuration shown in the figure, the end portion of the second electrode 4A on the −y-axis side coincides with the edge of the side wall 22 on the −y-axis side. Here, the configuration is not limited thereto, and the end portion of the second electrode 4A on the −y-axis side may be positioned on the +y-axis side with respect to the edge of the side wall 22 on the −y-axis side.

As described above, when the x-axis and the y-axis that are orthogonal to each other and the z-axis in the vertical direction are set, the container 2 is formed such that the z-axis direction is the depth direction, and the second electrode 4 has an elongated shape extending in the y-axis direction and is disposed separated from the first electrode 3 in the x-axis direction. In this manner, the remaining amount of the ink 100 in the container 2 can be accurately detected regardless of the precision in disposing the first electrode 3 and the second electrode 4 as described below.

Further, one first electrode 3 in the ink amount detection device 1 is configured to serve as one electrode plate of the first condenser Ca, one electrode plate of the second condenser Cb, and one electrode plate of the third condenser Cc. In this manner, when a voltage is applied to the first electrode 3, the same voltage can be applied to the first condenser Ca, the second condenser Cb, and the third condenser Cc. Therefore, variation in the detection precision for the capacitance of the first condenser Ca, the second condenser Cb, and the third condenser Cc is suppressed, and higher detection precision can be realized regardless of the remaining amount of the ink 100.

The ink amount detection device 1 is capable of preventing or suppressing degradation of the detection precision for the capacitance even when the position of each electrode is slightly deviated, as described below.

Figure 13:
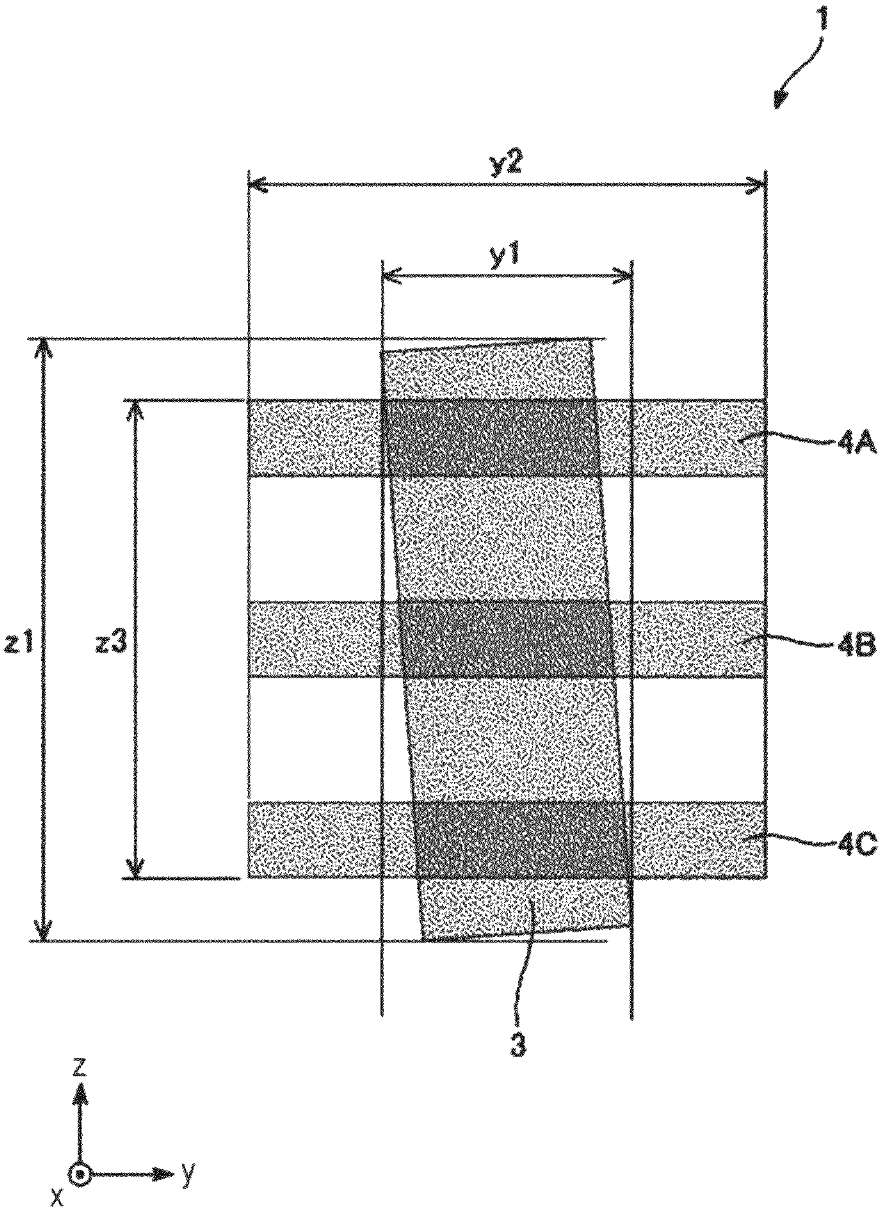
FIG. 13 is a schematic view for describing a positional relationship between a first electrode and a second electrode.

In the ink amount detection device 1, the length y1 of the first electrode 3 in the y-axis direction, the length z1 of the first electrode 3 in the z-axis direction, and the length y2 of the second electrodes 4A to 4C in the y-axis direction, and the length z2 of the second electrodes 4A to 4C in the z-axis direction satisfy expressions of $y1<y2$ and $z1>z2$ as shown in FIG. 5. In this manner, the areas of the effective regions 300A to 300C do not change even when the first electrode 3 and the second electrodes 4A to 4C are slightly deviated relatively in the +y-axis direction, the −y-axis direction, the +z-axis direction, and the −z-axis direction. For example, even when the extending direction of the first electrode 3 is provided in a state of being slightly inclined with respect to the z-axis direction as shown in FIG. 13, only the shapes of the effective regions 300A to 300C are changed from rectangles to parallelograms, but the areas do not change. Therefore, a decrease in the maximum capacitance of the first condenser Ca to the third condenser Cc can be prevented, and degradation of the detection precision of the capacitance can be prevented or suppressed. As a result, the remaining amount of the ink 100 in the container 2 can be accurately detected regardless of the precision in disposing the first electrode and the second electrodes 4A to 4C.

Although not shown in the figures, even when the extending direction of the second electrodes 4A to 4C is slightly inclined with respect to the y-axis, only the shapes of the effective regions 300A to 300C are changed in the same manner as described above, but the areas of the effective regions 300A to 300C do not change. Therefore, the same effects as described above can be obtained even when the precision in disposing the second electrodes 4A to 4C is poor.

As shown in FIG. 5, the first electrode 3 has portions protruding from the effective region 300A on the +z-axis side and the −z-axis side, portions protruding from the effective region 300B on the +z-axis side and the −z-axis side, and portions protruding from the effective region 300C on the +z-axis side and the −z-axis side when seen in the x-axis direction. In this manner, a change in the areas of the effective regions 300A to 300C can be more reliably prevented even when the precision in disposing the first electrode 3 and the second electrodes 4A to 4C is degraded.

As described above, in a case where the regions where the first electrode 3 and the second electrodes 4A to 4C overlap each other are defined as the effective region 300A, the effective region 300B, and the effective region 300C when seen in the x-axis direction, the first electrode 3 has portions respectively protruding from the effective regions 300A to 300C on the positive side in the z-axis direction and on the negative side in the z-axis direction. In this manner, a change in the areas of the effective regions 300A to 300C can be more reliably prevented even when the precision in disposing the first electrode 3 and the second electrodes 4A to 4C is degraded.

Further, as shown in FIG. 5, the second electrode 4A has portions protruding from the effective region 300A on the +y-axis side and the −y-axis side when seen in the +x-axis direction. Further, the second electrode 4B has portions protruding from the effective region 300B on the +y-axis side and the −y-axis side when seen in the +x-axis direction. Further, the second electrode 4C has portions protruding from the effective region 300C on the +y-axis side and the −y-axis side when seen in the +x-axis direction. In this manner, a change in the areas of the effective regions 300A to 300C can be more reliably prevented even when the precision in disposing the first electrode 3 and the second electrodes 4A to 4C is degraded.

As described above, in a case where the regions where the first electrode 3 and the second electrodes 4A to 4C overlap each other are defined as the effective region 300A, the effective region 300B, and the effective region 300C when seen in the x-axis direction, the second electrodes 4A to 4C have portions respectively protruding from the effective regions 300A to 300C on the positive side in the y-axis direction and on the negative side in the y-axis direction. In this manner, a change in the areas of the effective regions 300A to 300C can be more reliably prevented even when the precision in disposing the first electrode 3 and the second electrodes 4A to 4C is degraded.

Further, as shown in FIG. 5, the length z1 of the first electrode 3 is greater than the separation distance between a long side 41 of the second electrode 4A on the +z-axis side and a long side 42 of the second electrode 4C on the −z-axis side, that is, a maximum separation distance z3. That is, the length z1 of the first electrode 3 is greater than the maximum length of the regions where the first electrodes 4A to 4C are formed in the z-axis direction.

As described above, when the maximum separation distance between the long side 41 on the vertically upper side of the second electrode 4A positioned most vertically upward among the plurality of second electrodes 4 and the long side 42 on the vertically lower side of the second electrode 4C positioned most vertically downward among the plurality of second electrodes 4 along the z-axis is defined as z3, an expression of z1>z3 is satisfied. In this manner, the configuration in which the first electrode 3 has portions protruding from the effective regions 300A to 300C on the +z-axis side and the −z-axis side when seen in the x-axis direction can be more reliably realized. Therefore, the above-described effects can be more reliably exhibited.

When the total area of the effective regions 300A to 300C is defined as S0 and the area of the first electrode 3 is defined as S1, it is preferable to satisfy Expression of "0.03≤S0/S1≤0.7" and more preferable to satisfy Expression of "0.05≤S0/S1≤0.6". In this manner, the size of the effective regions 300A to 300C can be sufficiently ensured, and the detection precision of the ink 100 can be enhanced.

When the total area of the effective regions 300A to 300C is defined as S0 and the total area of the second electrodes 4A to 4C is defined as S2, it is preferable to satisfy Expression of "0.1≤S0/S2≤0.6" and more preferable to satisfy Expression of "0.2≤S0/S1≤0.5". In this manner, the size of the effective regions 300A to 300C can be sufficiently ensured, and the detection precision of the ink 100 can be enhanced.

When the maximum depth of the accommodation space 20 of the container 2 is defined as D1 and the minimum separation distance between the second electrode 4C and the bottom surface 212 which is a bottom portion of the container 2 when seen in the x-axis direction is defined as D2, it is preferable to satisfy Expression of "0≤D2/D1≤0.5" and more preferable to satisfy Expression of "0≤D2/D1≤0.3". In this manner, it is possible to detect that the remaining amount of the ink 100 is 0 or close to 0 by unevenly distributing the second electrode 4C on the bottom surface 212 side of the container 2.

Further, the first electrode 3 and the second electrodes 4A to 4C are respectively covered with an insulating layer 7 as shown in FIG. 6. Further, the outside of the insulating layer 7 is further covered with a shielding material 9. The shielding material 9 is an electromagnetic wave shield. When the shielding material 9 is provided, it is possible to prevent the first electrode 3 and the second electrodes 4A to 4C from electrically interfering with other electronic circuits or other electronic components (not shown) and to prevent a noise from entering a detection signal. Therefore, the detection precision of the remaining amount of the ink 100 can be enhanced. Further, when the insulating layer 7 is provided, it is possible to prevent the first electrode 3 and the second electrodes 4A to 4C from being electrically coupled to the shielding material 9.

The material constituting each insulating layer 7 is not particularly limited, and examples thereof include various rubber materials and various resin materials.

Further, each shielding material 9 is coupled to a reference potential, that is, a ground electrode. As the material constituting the shielding material 9, any of the same materials exemplified as the material constituting the first electrode 3 and the second electrodes 4A to 4C can be used.

Next, the circuit view illustrating the main parts of the ink amount detection device 1 will be described.

As shown in FIG. 7, the ink amount detection device 1 includes the first power supply 8A electrically coupled to the first electrode 3, the second power supply 8B respectively coupled to the second electrodes 4A to 4C, the first condenser Ca, the detection unit 5 respectively electrically coupled to the second condenser Cb, the third condenser Cc, and the second electrodes 4A to 4C, and the control unit 6. The first power supply 8A, the second power supply 8B, the detection unit 5, and the control unit 6 constitute the capacitance detection unit 50.

The first condenser Ca, the second condenser Cb, and the third condenser Cc are coupled in parallel with each other. The first power supply 8A applies pulse voltages with the same cycle, the same phase, and the same magnitude to the first electrode 3 of the first condenser Ca to the third condenser Cc. Further, the second power supply 8B respectively applies pulse voltages with the same cycle, the same phase, and the same magnitude to the second electrodes 4A to 4C of the first condenser Ca to the third condenser Cc. The magnitude of the pulse voltage applied by the first power supply 8A is different from the magnitude of the pulse voltage applied by the second power supply 8B. However, the present disclosure is not limited thereto, and the magnitude of the pulse voltage applied by the first power supply 8A may be the same as the magnitude of the pulse voltage applied by the second power supply 8B.

The frequency of the pulse voltage applied by the first power supply 8A or the second power supply 8B is preferably 1 kHz or greater and more preferably 1 MHz or greater. In this manner, for example, the remaining amount of the ink 100 can be accurately and rapidly detected even when the ink 100 adheres to the inner surface of the container 2 above the liquid face.

When the remaining amount of the ink 100 is detected, the first power supply 8A applies a pulse voltage of a pulse wave with a predetermined frequency to the first electrode 3. The second power supply 8B applies a pulse voltage of a pulse wave with the same frequency as that of the first power supply 8A to the second electrodes 4A to 4C. Further, the first power supply 8A is capable of switching between a state where a pulse voltage with the same phase as that of the second power supply 8B is applied to the first electrode 3 and a state where a pulse voltage with an opposite phase to that of the second power supply 8B is applied to the first electrode 3. In this manner, a first state where pulse voltages with the same phase are applied and a second state where pulse voltages with opposite phases are applied can be switched for the first condenser Ca to the third condenser Cc.

Further, in the equivalent circuit shown in FIG. 7, a first parasitic condenser Ca' is coupled in series to the first condenser Ca, a second parasitic condenser Cb' is coupled in series to the second condenser Cb, and a third parasitic condenser Cc' is coupled in series to the third condenser Cc.

The first parasitic condenser Ca' is a parasitic capacity formed of the first electrode 3 or the second electrode 4A of the first condenser Ca and peripheral portions thereof, for example, the insulating layer 7 and the shielding material 9 and is a portion that behaves like a condenser.

Similarly, the second parasitic condenser Cb' is a parasitic capacity formed of the first electrode 3 or the second electrode 4B of the second condenser Cb and peripheral portions thereof, for example, the insulating layer 7 and the shielding material 9 and is a portion that behaves like a condenser.

Similarly, the third parasitic condenser Cc' is a parasitic capacity formed of the first electrode 3 or the second electrode 4C of the third condenser Cc and peripheral portions thereof, for example, the insulating layer 7 and the shielding material 9 and is a portion that behaves like a condenser.

Further, the first parasitic condenser Ca' is coupled to the first condenser Ca in series in the equivalent circuit. Further, the second parasitic condenser Cb' is coupled to the second condenser Cb in series in the equivalent circuit. Further, the third parasitic condenser Cc' is coupled to the third condenser Cc in series in the equivalent circuit.

The detection unit 5 is an ammeter that temporarily detects the current between the first electrode 3 and the second electrode 4 as information related to the capacitance between the first electrode 3 and the second electrode 4. In the present embodiment, the detection unit 5 detects each of the currents of the first condenser Ca to the third condenser Cc. When the first power supply 8A and the second power supply 8B apply the pulse voltages to the first condenser Ca to the third condenser Cc, the capacitance values of the first condenser Ca to the third condenser Cc change depending on the presence or absence of the ink 100 and the current waveforms change according to the capacitances. The detection unit 5 outputs the information related to the currents to the control unit 6.

Further, the detection unit 5 may be a voltmeter that detects the voltage between the first electrode 3 and the second electrode 4 as information related to the capacitance between the first electrode 3 and the second electrode 4.

Figure 8:
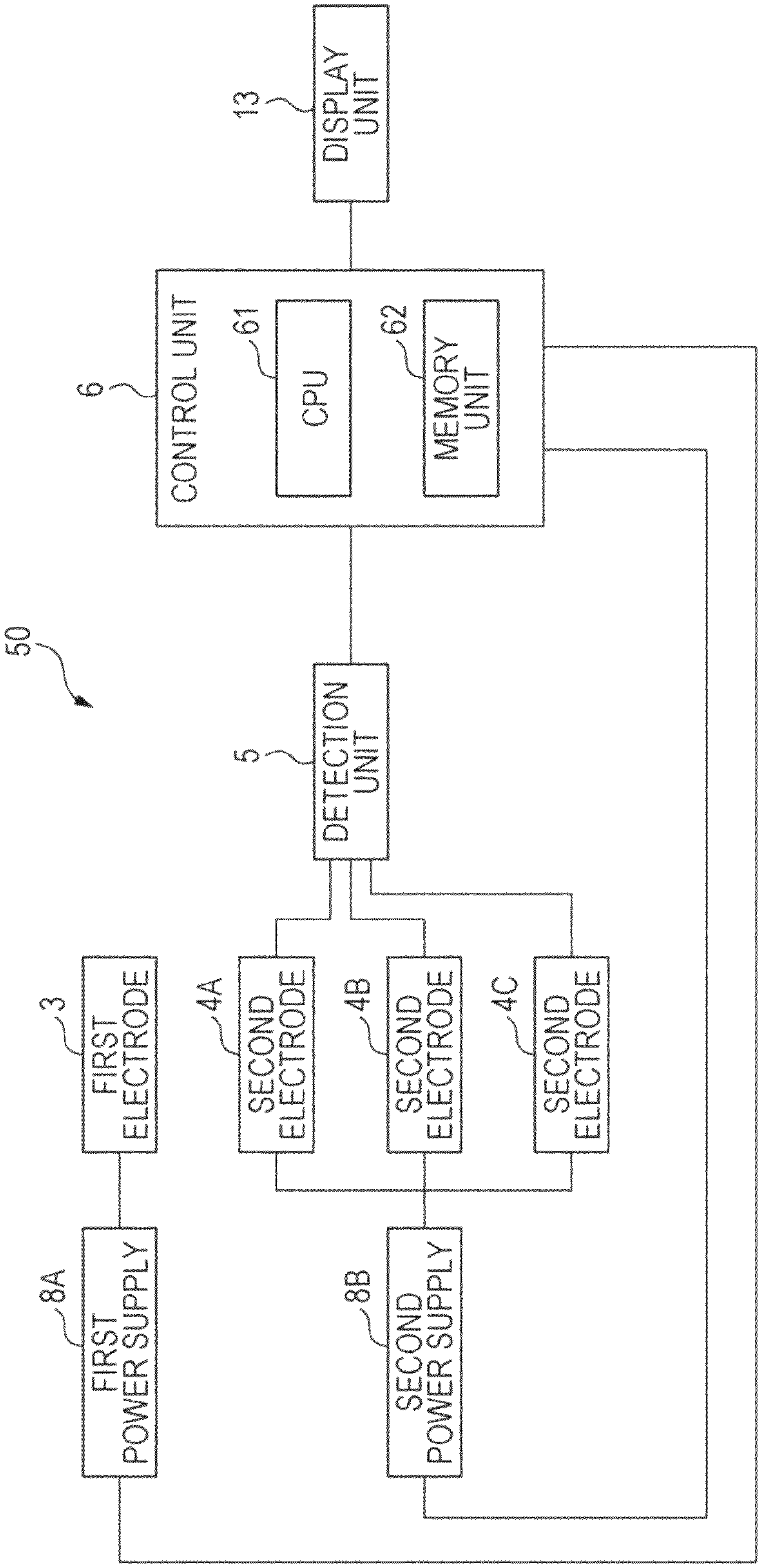
FIG. 8 is a block diagram showing the ink amount detection device shown in FIG. 2.

As shown in FIG. 8, the control unit 6 includes a central processing unit (CPU) 61 and a memory unit 62. The control unit 6 is a determination unit that determines the presence or absence of the ink 100 between the first electrode 3 and the second electrode 4 based on the detection results of the detection unit 5.

The CPU 61 reads and executes various programs and the like stored in the memory unit 62. The memory unit 62 stores various programs that can be executed by the CPU 61. Examples of the memory unit 62 include a volatile memory such as Random Access Memory (RAM) and a non-volatile memory such as Read Only Memory (ROM).

Further, various programs to be executed by the CPU 61 and first to third reference values K1 to K3 are stored in the memory unit 62.

Next, the principle of detecting the remaining amount of the ink 100 will be described. Hereinafter, the description will be made by focusing on the first condenser Ca, that is, the first electrode 3 and the second electrode 4A.

Figure 9:
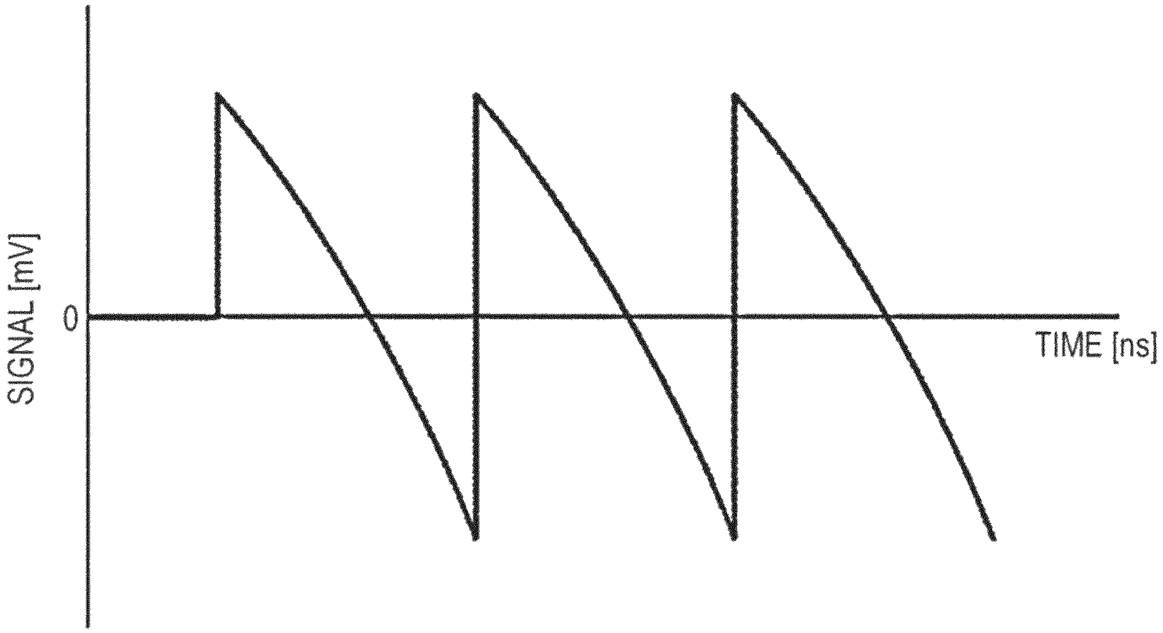
FIG. 9 is a graph showing a change in current detected by a detection unit over time.
Figure 10:
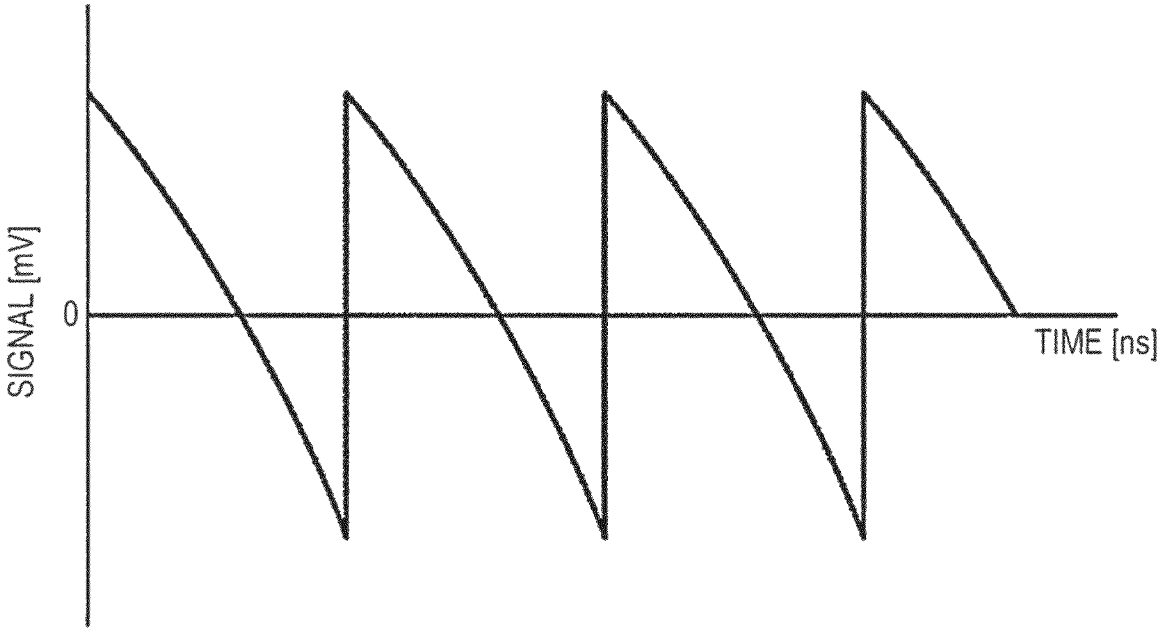
FIG. 10 is a graph showing a change in current detected by a detection unit over time.

When the liquid face of the ink 100 is positioned at a position P1 shown in FIG. 6, that is, when the ink 100 is present between the first electrode 3 and the second electrode 4A, the detection unit 5 detects the current waveform as shown in FIG. 9 in the first state with the same phase described above, and the detection unit 5 detects the current waveform as shown in FIG. 10 in the second state with opposite phases described above. These current waveforms have opposite phases.

The control unit 6 calculates each of an average current value I (A) in the first condenser Ca in the first state and an average current value I (B) in the first condenser Ca in the second state based on these current waveforms. The average current value I (A) in the first state is represented by Equation (1), and the average current value I (B) in the second state is represented by Equation (2).

$$I(1)=F((Vt-Vd)\cdot Cm+Vt\cdot CpT) \quad (1)$$

$$I(2)=F((Vt+Vd)\cdot Cm+Vt\cdot CpT) \quad (2)$$

In Equations (1) and (2), F represents the frequency of the pulse voltage, Vt represents the maximum value of the pulse voltage applied to the first electrode 3, Vd represents the maximum value of the pulse voltage applied to the second electrode 4, Cm represents the capacitance value of the first condenser Ca, and the CpT represents the capacitance value of the first parasitic condenser Ca'.

Further, the control unit 6 calculates a difference of "ΔI=I (A)−I (B)" between the average current value I (A) and the average current value I (B). That is, Equation (3) is calculated.

$$\Delta I=F((Vt-Vd)\cdot Cm+Vt\cdot CpT)-F((Vt+Vd)\cdot Cm+Vt\cdot CpT) \quad (3)$$

When Equation (3) is calculated, the difference is calculated by "ΔI=2F·Vd·Cm", the capacitance value CpT of the first parasitic condenser Ca' is canceled. Therefore, the detection of the remaining amount of the ink 100 is not affected by the capacitance value CpT of the first parasitic condenser Ca'.

Further, the control unit 6 determines whether the difference ΔI is less than the first reference value K1. The first reference value K1 is a value stored in the memory unit 62 in advance. Since the difference ΔI is greater than or equal to the first reference value K1 in the state where the ink 100 is present between the first electrode 3 and the second electrode 4 as described above, the control unit 6 determines that the ink 100 is present between the first electrode 3 and the second electrode 4.

Figure 11:
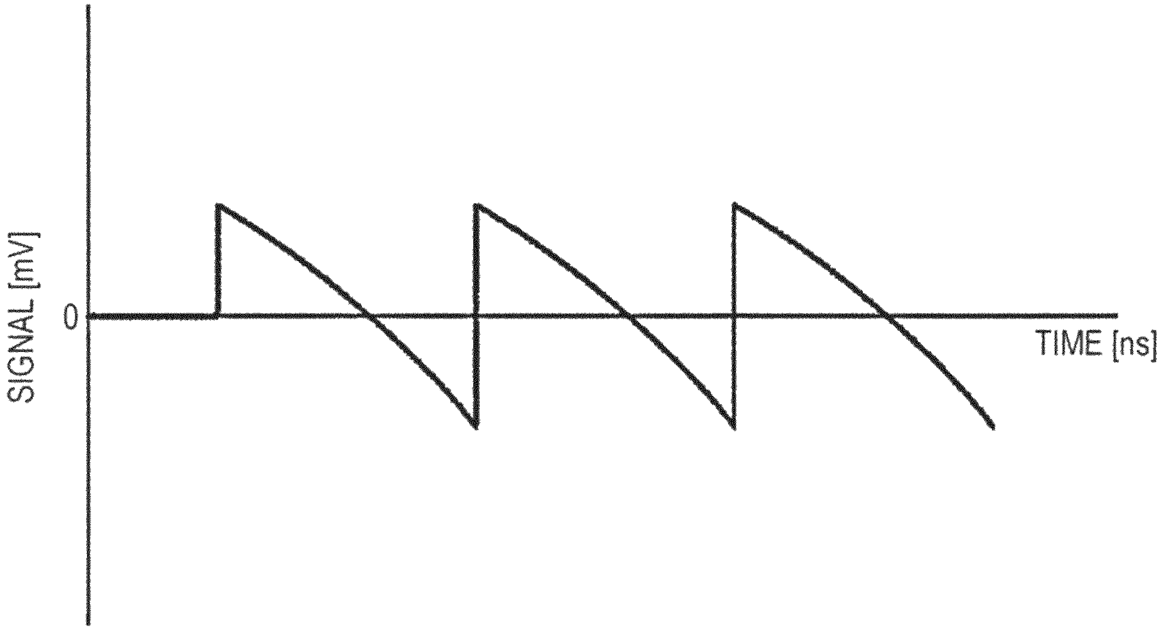
FIG. 11 is a graph showing a change in current detected by a detection unit over time.
Figure 12:
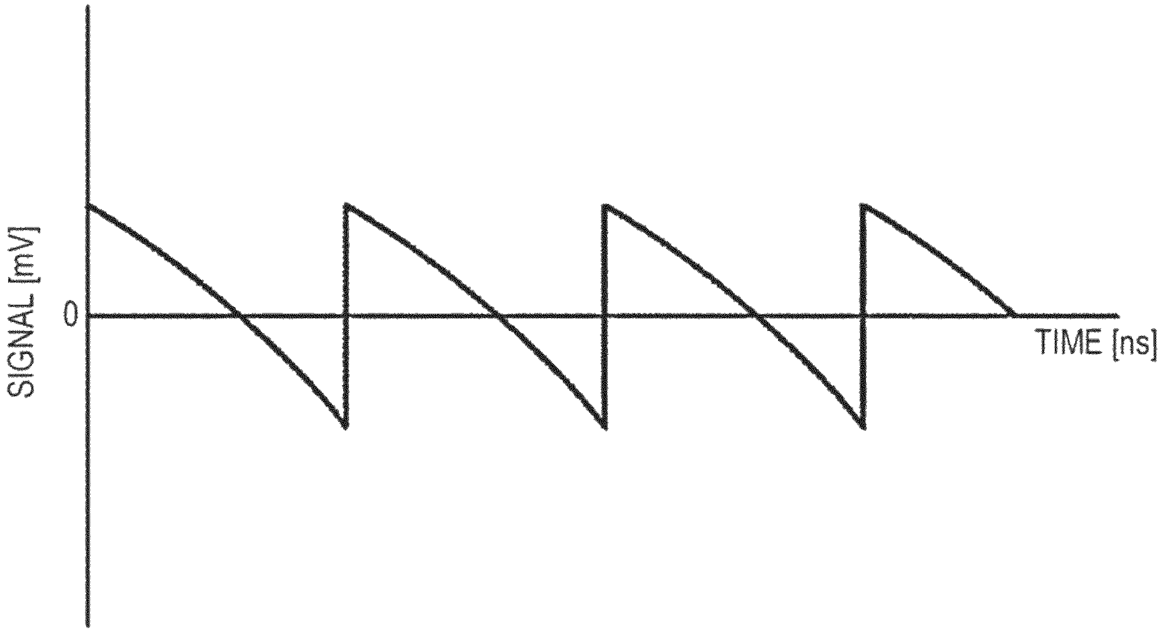
FIG. 12 is a graph showing a change in current detected by a detection unit over time.

Meanwhile, when the remaining amount of the ink 100 is reduced to the extent that the liquid face of the ink 100 is positioned at a position P2 shown in FIG. 6, that is, when the ink 100 is not present between the first electrode 3 and the second electrode 4A, the detection unit 5 detects the current waveform as shown in FIG. 11 in the first state with the same phase described above, and the detection unit 5 detects the current waveform as shown in FIG. 12 in the second state with opposite phases described above.

The amplitude of the current waveform shown in FIGS. 11 and 12, that is, the maximum value of the current is less than the maximum value of the current in the current waveform shown in FIGS. 9 and 10. The reason for this is that the capacitance of the first condenser Ca is changed due to a change of a dielectric in the first condenser Ca to the air from the ink 100.

Further, the control unit 6 calculates each of the average current value I (A) in the first state and the average current value I (B) in the second state, and the difference ΔI therebetween is calculated. In addition, the control unit 6 determines whether the difference ΔI is less than the first reference value K1. When the ink 100 is not present between the first electrode 3 and the fourth electrode 4A, the difference ΔI is less than the first reference value K1. Therefore, the control unit 6 determines that the ink 100 is not present between the first electrode 3 and the fourth electrode 4A.

As described above, a method of calculating the difference ΔI between the average current value I (A) of the first condenser Ca in the first state and the average current value I (B) of the first condenser Ca in the second state based on the detection results of the detection unit 5 and determining the presence or absence of the ink 100 based on the calculation results thereof is a so-called mutual capacity method. In such a mutual capacity method, since the capacitance value CpT of the first parasitic condenser Ca' is eliminated when the difference ΔI is calculated as described above, the value of the capacitance value CpT is not added to the difference ΔI. Therefore, the difference ΔI and the first reference value K1 can be accurately compared with each other, and the presence or absence of the ink 100 can be accurately determined.

The control unit 6 performs the same determination as described above on the second condenser Cb and the third condenser Cc. That is, the control unit 6 detects the presence or absence of the ink 100 between the first electrode 3 and the second electrode 4B and also detects the presence or absence of the ink 100 between the first electrode 3 and the second electrode 4C in the same manner as described above. Further, the second reference value K2 is used to detect the presence or absence of the ink 100 between the first electrode 3 and the second electrode 4B, and the third reference value K3 is used to detect the presence or absence of the ink 100 between the first electrode 3 and the second electrode 4C. The first reference value K1 to the third reference value K3 may be the same as or different from each other.

In the present embodiment, the detection unit 5 is configured to detect the current of the first condenser Ca to the third condenser Cc, but the present embodiment is not limited thereto, and the detection unit 5 may be, for example, configured to detect the voltage thereof.

Information related to the remaining amount of the ink 100 in the container 2 can be obtained based on the detection results of the detection unit 5 by performing the determination as described above.

Further, the information related to the remaining amount of the ink 100 includes, for example, information such as "0", "½", "1", "00", "30%", "60%", and "100%", in which the remaining amount of the ink 100 is quantified in stages and characters or symbols such as "A", "B", "C", and "D" which are ranked according to the remaining amount of the ink 100. Hereinafter, such information will be simply collectively referred to as "remaining amount of the ink 100".

Such information is displayed by the display unit 13 described above. The user can grasp the remaining amount of the ink 100.

As described above, the ink amount detection device 1 includes the container 2 internally having the accommodation space 20 that accommodates the ink 100 formed of a dielectric as the detection target, the first electrode 3 and at least one second electrode 4 disposed to face each other via the accommodation space 20, and the capacitance detection unit 50 detecting the capacitance between the first electrode 3 and the second electrode 4 using the mutual capacity method. The detection results are not affected by the parasitic capacity, that is, the first parasitic condenser Ca' to the third parasitic condenser Cc' by detecting the capacitance between the first electrode 3 and the second electrode 4 using the mutual capacity method. Therefore, the capacitance between the first electrode 3 and the second electrode 4 can be accurately detected. As a result, the remaining amount of the ink 100 can be accurately detected.

Further, the ink amount detection device includes the insulating layer 7 that covers the first electrode 3 and the second electrode 4, and the shielding material 9 serving as an electromagnetic wave shield that covers the insulating layer 7. With such a configuration, it is possible to prevent conduction of the first electrode 3 and the second electrode 4 with the surroundings and to reduce the influence of noise as described above. Further, with such a configuration, the first parasitic condenser Ca' to the third parasitic condenser Cc' described above are formed in the equivalent circuit. However, in the present embodiment, since the capacitance detection unit 50 detects the remaining amount of the ink 100 using the mutual capacity method, the influence of the first parasitic condenser Ca' to the third parasitic condenser Cc' can be ignored. That is, the effects of the present embodiment are significant due to the configuration including the insulating layer 7 and the shielding material 9.

Further, the capacitance detection unit 50 includes the first power supply 8A applying the pulse voltage to the first electrode 3 and capable of switching the phase of the pulse voltage, the second power supply 8B applying the pulse voltage to the second electrode 4, and detection unit 5 detecting the current or the voltage between the first electrode 3 and the second electrode 4. Further, the capacitance detection unit 50 includes the control unit 6 serving as the determination unit that determines the presence or absence of the detection target between the first electrode 3 and the second electrode 4 based on the detection result of the detection unit 5. In this manner, the remaining amount of the ink 100 can be detected by the mutual capacity method described above.

Further, the control unit 6 serving as the determination unit performs calculation to offset the parasitic capacity (the capacitance of the first parasitic condenser Ca' to the third parasitic condenser Cc') of the circuit including the first power supply 8A, the second power supply 8B, and the detection unit 5 based on the detection results of the detection unit 5 as described above. In this manner, the influence of the first parasitic condenser Ca' to the third parasitic condenser Cc' can be ignored, and the remaining amount of the ink 100 can be accurately detected.

Further, the recording device 10 according to the present embodiment includes the ink amount detection device 1. In this manner, printing can be performed with the advantages of the ink amount detection device 1. Particularly, since the remaining amount of the ink 100 can be accurately detected, it is possible to prevent the printing from being stopped at an unintended timing by appropriately replenishing the ink 100, for example, when the remaining amount of the ink is reduced. Further, when a plurality of the second electrodes 4 are present, the degree of reduction of the ink 100 can be grasped at stages, and the timing for replenishing the ink can be predicted satisfactorily.

Figure 14:
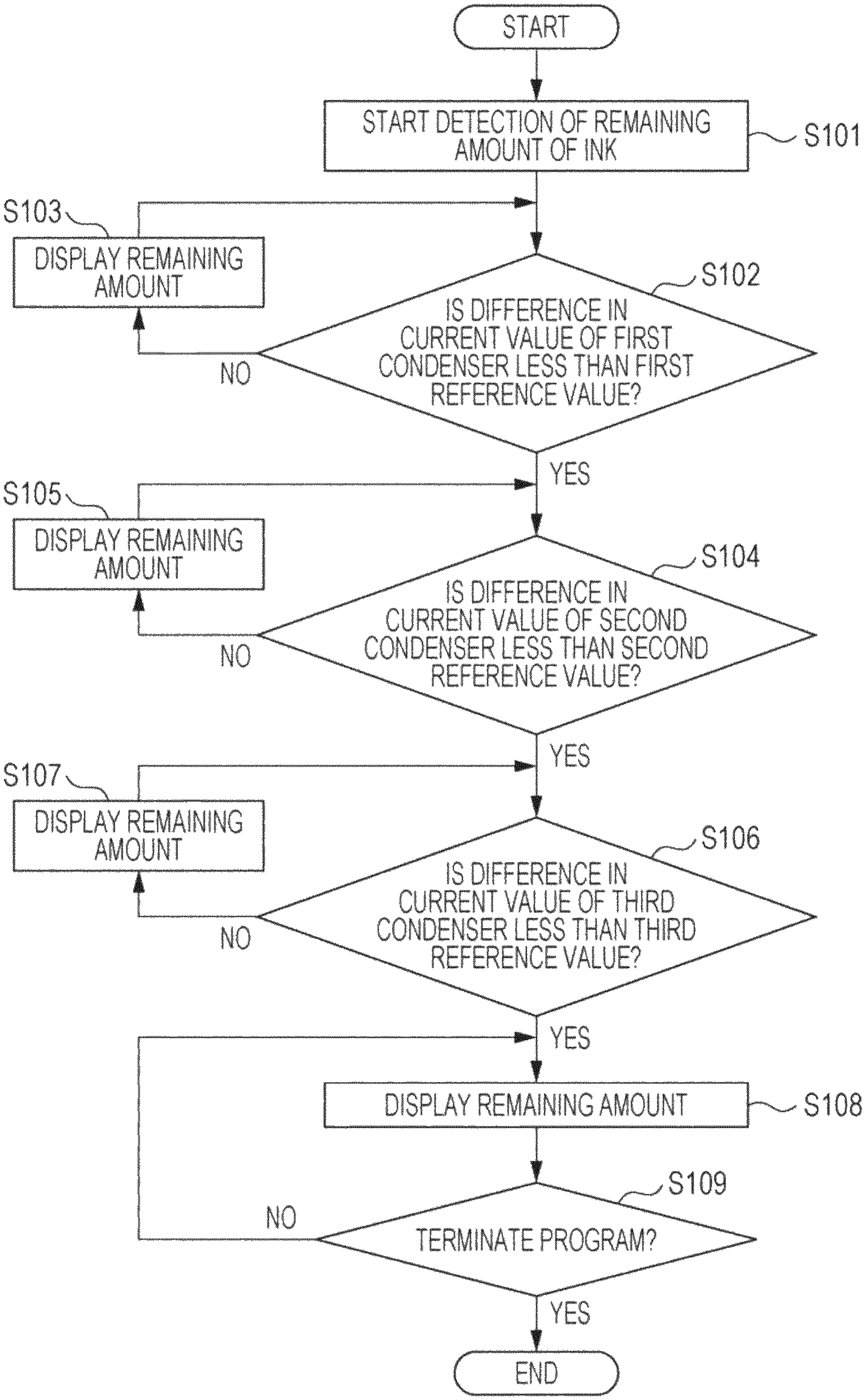
FIG. 14 is a flow chart for describing a control operation performed by a control unit shown in FIG. 8.

Next, the control operation performed by the control unit 6 will be described with reference to the flow chart shown in FIG. 14.

First, the detection of the remaining amount of the ink 100 is started in Step S101. That is, the voltages are applied to the first condenser Ca to the third condenser Cc shown in FIG. 7, and the currents corresponding to the first condenser Ca to the third condenser Cc are respectively detected.

Further, the control unit determines whether the difference ΔI between the average current value I (A) and the average current value I (B) of the first condenser Ca (hereinafter, also referred to as "difference ΔI") is less than the first reference value K1 in Step S102. For example, when the liquid face of the ink 100 is positioned at the position P1 as shown in FIG. 6, the dielectric in the first condenser Ca is the ink 100, the difference ΔI is greater than or equal to the first reference value K1, the control unit determines that the difference ΔI is not less than the first reference value K1 in Step S102, and the remaining amount of the ink is displayed in Step S103. That is, the display unit 13 displays that the liquid face of the ink 100 is positioned above the first condenser Ca.

The display method is carried out by using information such as "0", "½", "1", "0%", "30%", "60%", and "100", in which the remaining amount of the ink 100 is quantified in stages and characters or symbols such as "A", "B", "C", and "D" which are ranked according to the remaining amount of the ink 100 as described above. In Step S103, for example, "100%" or "A" is displayed.

When the control unit determines that the difference ΔI of the first condenser Ca is less than the first reference value K1 in Step S102, the process proceeds to Step S104. For example, when the liquid face of the ink 100 is positioned at the position P2 shown in FIG. 6, the dielectric in the first condenser Ca is air, and the amplitude of the current of the first condenser Ca is decreased as shown in FIG. 11.

The control unit determines whether the difference ΔI of the second condenser Cb is less than the second reference value K2 in Step S104. When the liquid face of the ink 100 is positioned at the position P2 shown in FIG. 6, the dielectric in the second condenser Cb is the ink 100, and the difference ΔI of the second condenser Cb is greater than or equal to the second reference value K2. In this case, the control unit determines that the difference ΔI of the second condenser Cb is not less than the second reference value K2 in Step S104, and the remaining amount of the ink is displayed in Step S105. That is, the display unit 13 displays that the liquid face of the ink 100 is positioned between the first condenser Ca and the second condenser Cb. In Step S105, for example, "60%" or "B" is displayed.

When the control unit determines that the difference ΔI of the second condenser Cb is less than the second reference value K2 in Step S104, the process proceeds to Step S106. For example, when the liquid face of the ink 100 is positioned at a position P3 shown in FIG. 6, the dielectric in the second condenser Cb is air, and the amplitude of the current of the second condenser Cb is decreased as shown in FIG. 11.

The control unit determines whether the difference ΔI of the third condenser Cc is less than the third reference value K3 in Step S106. When the liquid face of the ink 100 is positioned at the position P3 shown in FIG. 6, the dielectric in the third condenser Cc is the ink 100, the control unit determines that the difference ΔI of the third condenser Cc is not less than the third reference value K3 in Step S106, and the remaining amount is displayed in Step S107 That is, the display unit 13 displays that the liquid face of the ink 100 is positioned between the second condenser Cb and the third condenser Cc. In Step S107, for example, "30%" or "C" is displayed.

When the control unit determines that the difference ΔI of the third condenser Cc is less than the third reference value K3 in Step S106, the display unit 13 displays that the remaining amount of the ink 100 is 0 in Step S108. For example, "0%" or "D" is displayed in Step S108.

For example, when the remaining amount of the ink 100 is 0, the dielectric in the third condenser Cc is air, and the amplitude of the current of the third condenser Cc is decreased as shown in FIG. 11.

Further, the control unit determines whether an instruction to terminate the program is made in Step S109. The determination of the present step is, for example, performed based on whether the user of the recording device has turned off the power supply. When the control unit determines that the user has made an instruction to termination the program in Step S109, the program is terminated. Further, when the control unit determines that the user has not made an instruction to terminate the program in Step S109, the process returns to Step S108 which is the state where the display unit 13 displays that the remaining amount of the ink 100 is 0.

The remaining amount of the ink 100 can be accurately detected by performing the above-described steps. Further, the control operation shown in FIG. 15 may be performed. Hereinafter, only a difference between the control operations shown in FIGS. 14 and 15 will be described.

Figure 15:
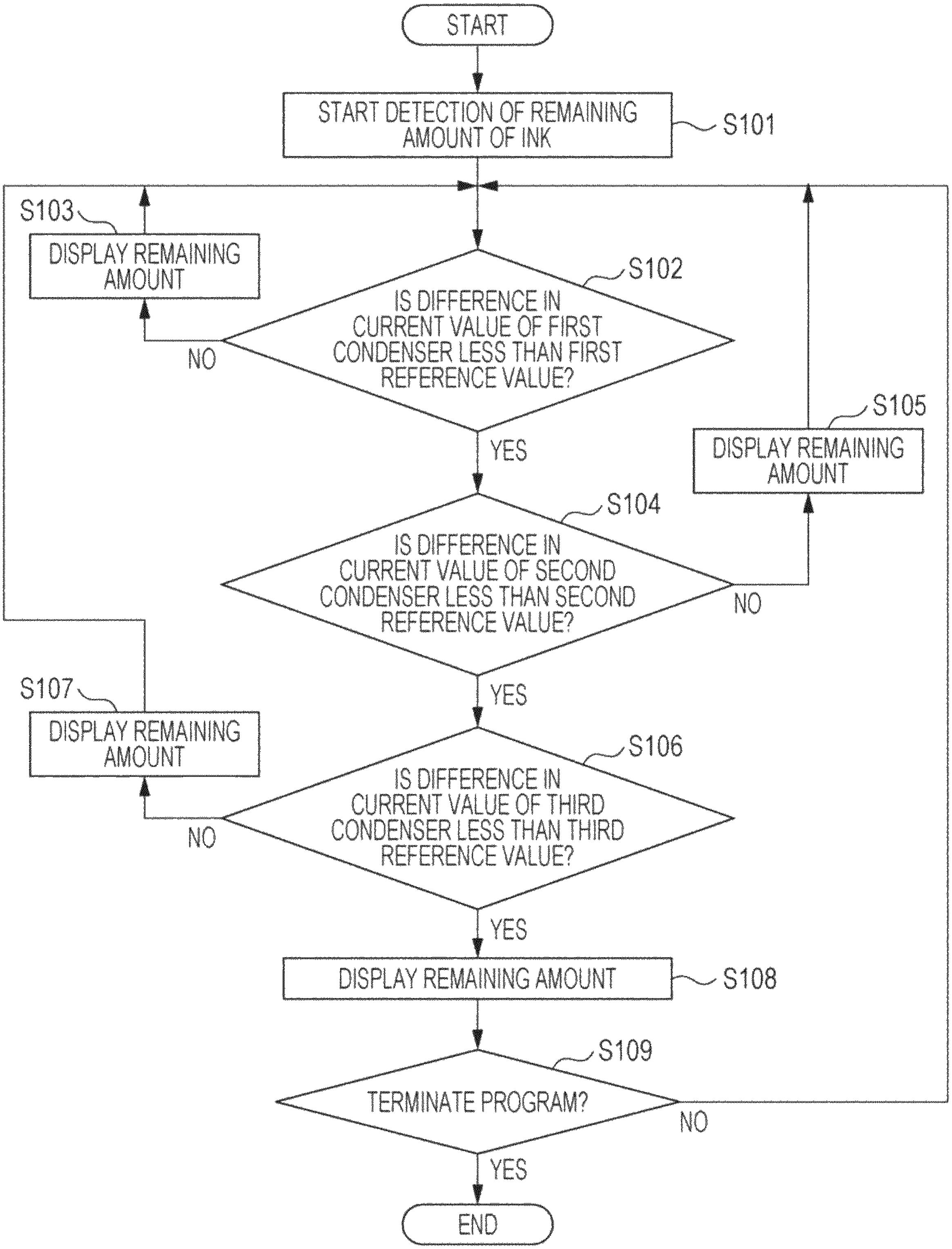
FIG. 15 is a flow chart for describing the control operation performed by the control unit shown in FIG. 8.

In the control operation shown in FIG. 15, the process returns to Step S102 after Step S103, the process returns to Step S102 after Step S105, and the process returns to Step S102 when the control unit determines NO in Step S109. That is, when the remaining amount of the ink 100 is detected, the differences ΔI of all the first condenser Ca to the third condenser Cc are detected regardless of the remaining amount of the ink 100. According to such a configuration, the amount of the ink 100 after replenishment can be accurately detected even when the ink 100 is replenished in the middle of the process.

Hereinbefore, the ink amount detection device and the recording device of the present embodiment have been described based on the embodiments shown in the figures, but the present disclosure is not limited thereto, and the configuration of each unit can be replaced with an optional configuration having the same functions. Further, other optional configurations may be added.

Further, the container may be configured to be detachable from and attachable to the recording device or may be configured to be fixed thereto. When the container can be detachable from and attachable to the recording device, the container may be configured to be exchanged with a new container as soon as the ink runs out or may be configured to be repeatedly used after the ink is replenished. When the container is configured to be fixed to the recording device, the container is used by replenishing the ink in a case where the remaining amount of the ink is decreased.

Further, in the present embodiment, a case where the ink amount detection device is applied to an ink tank of a recording device has been described, but the present disclosure is not limited thereto, and the ink amount detection device can be suitably applied to the detection of the remaining amount of a dielectric material tank having an internal capacity that changes. Other embodiments may include a molding material tank for a 3D printer or an injection molding machine, a water heater, a drinking water tank, a medical tank for a drip or insulin, and a refrigerant tank for cooling. Further, the present disclosure is not limited to the liquid tank, and can be applied to the detection of the remaining amount of a solid, for example, a stocker for paper feed or a stocker for paper discharge.

EXAMPLES

Hereinafter, the present disclosure will be described based on examples, but the present disclosure is not limited thereto. Hereinafter, "parts" denote parts by mass unless otherwise specified.

1. Preparation of Ink Jet Ink Composition

Examples 1 to 15 and Comparative Example 1 and 2

Each raw material was placed in a tank for a mixture to have the composition listed in Tables 1 and 2, and the mixture was mixed and stirred for 2 hours with a magnetic stirrer and sufficiently mixed by performing a dispersion treatment in a bead mill filled with zirconia beads having a diameter of 0.3 mm. The mixture was stirred for 1 hour and filtered through a 5.0 μm PTFE membrane filter, thereby obtaining an ink composition of each example and each comparative example. The numerical values in Tables 1 and 2 are in units of % by mass. The mass of each ink was adjusted to 100% by mass by adding ink exchange water as water.

Further, each component listed in Tables 1 and 2 is as follows.

[Coloring Material]

DB199: C.I. Direct Blue 199 (commercially available product)

Yellow dye: yellow dye represented by Formula (1)

DY86: C.I. Direct Yellow 86 (commercially available product)

DY136: C.I. Direct Yellow 136 (commercially available product)

Black dye: black dye represented by Formula (2)

RR14: C.I. Reactive Red 14 (commercially available product)

Magenta dye: magenta dye represented by Formula (3)

[Water-Soluble Organic Solvent]

Glycerin

Triethylene glycol

Triethylene glycol monobutyl ether 1,2-Hexanediol

[pH Adjusting Agent]

Potassium hydroxide

Adipic acid

[Surfactant]

104PG-50: SURFYNOL (registered trademark) 104PG-50 (manufactured by Nissin Chemical Co., Ltd.)

E1010: OLFINE (registered trademark) E1010 (manufactured by Nissin Chemical Co., Ltd.)

TABLE 1

| | | | Example 1 | Example 2 | Example 3 | Example 4 | Example 5 |
|---|---|---|---|---|---|---|---|
| Ink jet ink composition (% by mass) | Coloring material | DB199 | 4 | 4 | 4 | | |
| | | Yellow dye | | | | | |
| | | DY86 | | | | | |
| | | DY136 | | | | | |
| | | Black dye | | | | | |
| | | PR141 | | | | | |
| | | Magenta dye | | | | 4 | 4 |
| | Water-soluble organic solvent | Glycerin | 10 | 10 | 10 | 10 | 10 |
| | | Triethylene glycol | 5 | 5 | 5 | 5 | 5 |
| | | Triethylene glycol monobutyl ether | 10 | 10 | 10 | 10 | 10 |
| | | 1,2-Hexanediol | 1 | 1 | 1 | 1 | 1 |
| | pH adjusting agent | Potassium hydroxide | | 0.1 | 0.5 | | |
| | | Adipic acid | | 0.01 | 0.03 | | |
| | Surfactant | 104PG-50 | 0.4 | 0.4 | 0.4 | 0.4 | 0.8 |
| | | E1010 | 0.4 | 0.4 | 0.4 | 0.4 | 0.8 |
| | Pure water | | Remaining amount | Remaining amount | Remaining amount | Remaining amount | Remaining amount |
| | Total | | 100 | 100 | 100 | 100 | 100 |

| | | | Example 6 | Example 7 | Example 8 | Example 9 | Example 10 |
|---|---|---|---|---|---|---|---|
| Ink jet ink composition (% by mass) | Coloring material | DB199 | 2 | | 4 | 4 | |
| | | Yellow dye | | | | | |
| | | DY86 | | | | | |
| | | DY136 | | | | | |
| | | Black dye | | | | | |
| | | PR141 | | | | | 4 |
| | | Magenta dye | | 2 | | | |

TABLE 1-continued

| | | | | | | |
|---|---|---|---|---|---|---|
| Water-soluble organic solvent | Glycerin | 10 | 10 | 10 | 10 | 10 |
| | Triethylene glycol | 5 | 5 | 5 | 5 | 5 |
| | Triethylene glycol monobutyl ether | 10 | 10 | 10 | 10 | 10 |
| | 1,2-Hexanediol | 1 | 1 | 1 | 1 | 1 |
| pH adjusting agent | Potassium hydroxide | | | 1 | 0.1 | 0.1 |
| | Adipic acid | | | 0.05 | 0.01 | 0.01 |
| Surfactant | 104PG-50 | 0.4 | 0.4 | 0.4 | 1 | 0.4 |
| | E1010 | 0.4 | 0.4 | 0.4 | 0.8 | 0.4 |
| Pure water | | Remaining amount | Remaining amount | Remaining amount | Remaining amount | Remaining amount |
| Total | | 100 | 100 | 100 | 100 | 100 |

TABLE 2

| | | | Example 11 | Example 12 | Example 13 | Example 14 | Example 15 | Comparative Example 1 | Comparative Example 2 |
|---|---|---|---|---|---|---|---|---|---|
| Ink jet ink composition (% by mass) | Coloring material | DB199 | | | | | | | |
| | | Yellow dye | | | 4 | | | | |
| | | DY86 | | | | 4 | | | |
| | | DY136 | | | | | 4 | | |
| | | Black dye | | 4 | | | | | |
| | | PR141 | 2 | | | | | | |
| | | Magenta dye | | | | | | 4 | 4 |
| | Water-soluble organic solvent | Glycerin | 10 | 10 | 10 | 10 | 10 | 10 | 10 |
| | | Triethylene glycol | 5 | 5 | 5 | 5 | 5 | 5 | 5 |
| | | Triethylene glycol monobutyl ether | 10 | 10 | 10 | 10 | 10 | 9 | 9 |
| | | 1,2-Hexanediol | 1 | 1 | 1 | 1 | 1 | 1 | 1 |
| | pH adjusting agent | Potassium hydroxide | 0.1 | 0.1 | 0.1 | 0.1 | 0.1 | 0.5 | 0.5 |
| | | Adipic acid | 0.01 | 0.01 | 0.01 | 0.01 | 0.01 | 0.03 | 0.03 |
| | Surfactant | 104PG-50 | 0.4 | 0.3 | 0.6 | 0.6 | 0.6 | 0.4 | 0.4 |
| | | E1010 | 0.4 | 0.4 | 0.6 | 0.6 | 0.6 | 0.4 | 0.4 |
| | Pure water | | Remaining amount | Remaining amount | Remaining amount | Remaining amount | Remaining amount | Remaining amount | Remaining amount |
| | Total | | 100 | 100 | 100 | 100 | 100 | 100 | 100 |

2. Production of Ink Container

An ink container having the same shape as in FIG. 2 and internally having an accommodation space accommodating an ink composition was prepared by a known method. Further, all members constituting the inner wall surface of the accommodation space and members of the ink container were made of polypropylene.

3. Measurement and Evaluation Method 3.1. Electrical Conductivity of Ink Composition The electrical conductivity (mS/cm) of each ink composition obtained above was measured with an electrical conductivity meter ES-51 (trade name, manufactured by Horiba, Ltd.). The results are listed in Tables 3 and 4.

3.2. Surface Tension of Ink Composition

The surface tension (mN/m) of each ink composition obtained above was measured by the Wilhelmy method using liquid droplets obtained by wetting each ink composition on a platinum plate at normal temperature under normal pressure with a surface tension meter CBVP-Z (trade name, manufactured by Kyowa Interface Science, Co., Ltd.). The results are listed in Tables 3 and 4.

3.3. Detection Precision

The detection precision was evaluated as follows.

First, a container including a first electrode serving as a transmission mechanism and one second electrode serving as a capacitance reception mechanism which was disposed on a side opposite to the transmission mechanism so as to face the transmission mechanism and configured to perform transmission and reception and internally having an accommodation space accommodating an ink composition was prepared as an ink container used to evaluate the detection precision. Further, the ink container was prepared to have the same shape as in FIG. 1. The height of the first electrode in the z-axis direction in the ink container was 10 mm, and the width thereof in the y-axis direction was 20 mm. The height of the second electrode in the z-axis direction in the ink container was 0.5 mm, and the width thereof in the y-axis direction was 20 mm. Further, in the first electrode and the second electrode, the lengths from the top plate to the upper end of the electrodes in the z-axis direction, that is, the heights in the −z-axis direction were set to be the same as each other. Further, the members of the ink container and the members constituting the inner wall surface of the accommodation space were made of polypropylene.

In the ink container, the ink container was filled with each ink composition obtained above such that the space between the first electrode and the upper end of the second electrode in the z-axis direction was filled with the ink composition. Thereafter, the space between the first electrode and the second electrode was no longer filled with the ink composition in the −z-axis direction, and the ink composition was further used until the capacitance between the first electrode and the second electrode was no longer detected. Thereafter, the height from the lower end of the second electrode in the z-axis direction to the liquid face of the ink composition after use was measured with a vernier caliper. Based on the measurement results, the detection precision was evaluated according to the following criteria. The measurement results are listed in Tables 3 and 4. As the height measured with a vernier caliper increased, it was determined that the space between the first electrode and the second electrode was filled with the ink composition even though the liquid face of the ink composition was actually positioned below the second electrode. In other words, the detection precision was evaluated as low.

(Evaluation Criteria)

A: The height measured with a vernier caliper was less than 1 mm.

B: The height measured with a vernier caliper was greater than 1 mm and less than 6 mm.

C: The height measured with a vernier caliper was less than 6 mm.

3.4. Storage Stability

The storage stability of the ink composition was evaluated as follows.

A storage bottom capable of sealing the ink was filled with each ink composition obtained above, and this storage bottom was placed in a constant temperature tank at 60° C. The storage bottom was allowed to stand for 2 hours, taken out from the tank, and sufficiently cooled to room temperature, and the viscosity was measured using a vibration type viscometer in conformity with JIS Z 8809. A rate in change of the viscosity immediately after the standing for 2 hours with respect to the initial viscosity before the standing was calculated, and the storage stability was evaluated based on the following criteria. The results are listed in Tables 3 and 4.

(Evaluation Criteria)

A: The rate in change of the viscosity of the ink composition was less than ±2%.

B: The rate in change of the viscosity of the ink composition was ±2% or greater.

TABLE 3

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Physical properties of ink composition | Electrical conductivity of ink composition (mS/cm) | 1.9 | 3 | 4 | 7 | 7 | 1.1 | 3.8 | 3.2 | 3.2 | 2.6 |
| | Surface tension of ink composition (mN/cm) | 28 | 28 | 28 | 28 | 26 | 28 | 28 | 28 | 24 | 28 |
| Evaluation results | Detection precision | A | A | B | B | B | A | B | B | B | A |
| | Storage stability | B | A | A | B | B | B | B | A | A | A |

TABLE 4

| | | Example 11 | Example 12 | Example 13 | Example 14 | Example 15 | Comparative Example 1 | Comparative Example 2 |
|---|---|---|---|---|---|---|---|---|
| Physical properties of ink composition | Electrical conductivity of ink composition (mS/cm) | 1.6 | 4.3 | 5.1 | 1.6 | 1.9 | 11 | 11 |
| | Surface tension of ink composition (mN/cm) | 28 | 29 | 28 | 27 | 27 | 29 | 28 |
| Evaluation results | Detection precision | A | A | A | A | A | C | C |
| | Storage stability | A | A | A | A | A | A | A |

According to the present embodiment, it was found that an ink jet recording device capable of detecting the height of the ink liquid face more accurately and detecting the remaining amount of the ink with higher precision can be obtained as listed in Tables 3 and 4.

Based on the comparison between Examples 2 and 9, it was found that when the surface tension of the ink composition is 25 mN/m or greater, the wall surface is less likely to be wet with the ink composition, formation of a thin film derived from the ink composition and remaining of the ink composition can be more suitably suppressed, and thus the height of the ink liquid face can be detected more accurately and the remaining amount of the ink can be detected with high precision.

Based on the comparison between Examples 1 and 2, it was found that the storage stability is improved when the ink composition contains a pH adjusting agent. Further, it was found that since the electrical conductivity of the ink composition can also be further decreased, the height of the ink liquid face can be detected more accurately and the remaining amount of the ink can be detected with high precision.

What is claimed is:

1. An ink jet recording device comprising:

an ink amount detection device that includes a container internally having an accommodation space that accommodates an ink jet ink composition;

a first electrode and at least one second electrode disposed to face each other via the accommodation space; and a capacitance detection unit detecting a capacitance between the first electrode and the second electrode using a mutual capacity method, wherein the ink jet ink composition has an electrical conductivity of 10.0 mS/cm or less, wherein the ink jet ink composition contains at least one of a yellow dye represented by Formula (1), a black dye represented by Formula (2), and a magenta dye represented by Formula (3), (1)

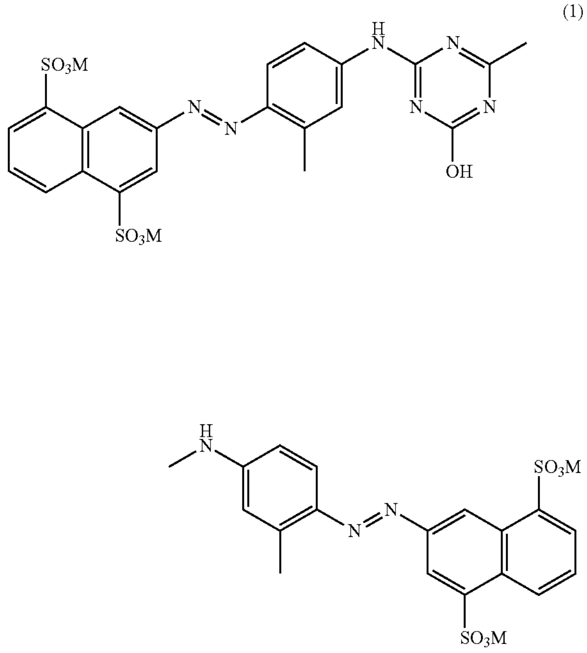

wherein in Formula (1), M represents Na or Li, (2)

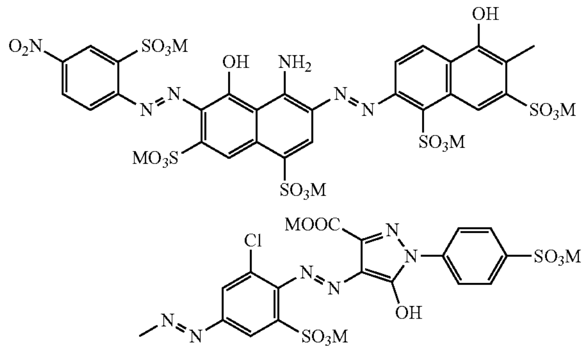

wherein in Formula (2), M represents Li, and (3)

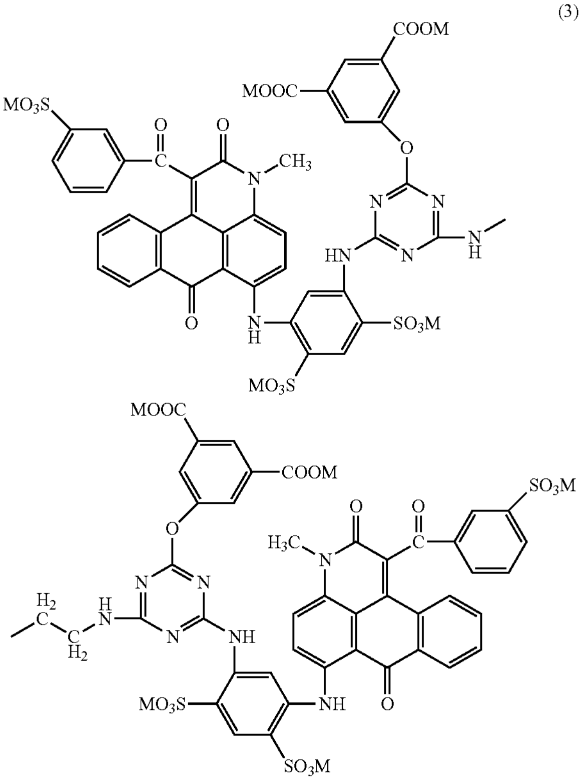

wherein in Formula (3), M represents $NH_4$ or Na; and wherein the first electrode and the second electrode are each covered by an insulating layer, and the insulating layer is covered by an electromagnetic shield.

2. The ink jet recording device according to claim 1, wherein the ink jet ink composition has a surface tension of 25 mN/m or greater.

3. The ink jet recording device according to claim 1, wherein a content of the dye is 5.0% by mass or less with respect to a total amount of the ink jet ink composition.

4. The ink jet recording device according to claim 1, wherein the ink jet ink composition is a light color ink.

5. The ink jet recording device according to claim 1, wherein the ink jet ink composition contains a pH adjusting agent, and a content of the pH adjusting agent is 1.0% by mass or less with respect to a total amount of the ink jet ink composition.

6. The ink jet recording device according to claim 1, wherein when an x-axis and a y-axis that are orthogonal to each other and a z-axis in a vertical direction are set, the container is formed such that the z-axis direction is a depth direction, and the first electrode has an elongated shape extending in the z-axis direction.

7. The ink jet recording device according to claim 1, wherein a plurality of the second electrodes are provided in a state of being separated from each other in the z-axis direction.

* * * * *